(12) United States Patent
Trefler et al.

(10) Patent No.: US 8,924,335 B1
(45) Date of Patent: Dec. 30, 2014

(54) RULE-BASED USER INTERFACE CONFORMANCE METHODS

(75) Inventors: Alan Trefler, Brookline, MA (US);
Baruch A. Sachs, Providence, RI (US)

(73) Assignee: Pegasystems Inc., Cambridge, MA (US)

( * ) Notice: Subject to any disclaimer, the term of this patent is extended or adjusted under 35 U.S.C. 154(b) by 496 days.

(21) Appl. No.: 13/031,109

(22) Filed: Feb. 18, 2011

Related U.S. Application Data

(63) Continuation-in-part of application No. 12/174,624, filed on Jul. 16, 2008, now abandoned, and a continuation-in-part of application No. 12/035,682, filed on Feb. 22, 2008, now abandoned, which is a continuation-in-part of application No. 11/396,415, filed on Mar. 30, 2006, now abandoned.

(60) Provisional application No. 61/063,269, filed on Jan. 31, 2008.

(51) Int. Cl.
*G06F 17/00* (2006.01)
*G06N 5/02* (2006.01)

(52) U.S. Cl.
USPC .......................................................... 706/47

(58) Field of Classification Search
None
See application file for complete search history.

(56) References Cited

U.S. PATENT DOCUMENTS

| | | | |
|---|---|---|---|
| 4,047,059 A | 9/1977 | Rosenthal | |
| 4,344,142 A | 8/1982 | Diehr, II et al. | |
| 4,602,168 A | 7/1986 | Single | |
| 4,607,232 A | 8/1986 | Gill, Jr. | |
| 4,659,944 A | 4/1987 | Miller, Sr. et al. | |
| 4,701,130 A | 10/1987 | Whitney et al. | |
| 4,866,634 A | 9/1989 | Reboh et al. | |
| 4,884,217 A | 11/1989 | Skeirik et al. | |
| 4,895,518 A | 1/1990 | Arnold et al. | |

(Continued)

FOREIGN PATENT DOCUMENTS

| | | |
|---|---|---|
| DE | 19911098 A1 | 12/1999 |
| EP | 0 549 208 A2 | 6/1993 |

(Continued)

OTHER PUBLICATIONS

Gajos et al. "SUPPLE: Automatically Generating User Interfaces", IUI 2004, pp. 8.*

(Continued)

*Primary Examiner* — Li-Wu Chang
(74) *Attorney, Agent, or Firm* — Nutter McClennen & Fish LLP

(57) ABSTRACT

The invention provides in one aspect a method that includes identifying one or more rules for execution by a rules engine in order to generate a user interface. The method further includes executing, on a digital data processing system that comprises one or more digital data processors, a step of determining whether one or more aspects of the user interface generated as a result of execution of at least one of those rules is in conformity with one or more requirements. The system responds to a negative such determination, according to the method, by identifying modifications to generate a conforming user interface from those one or more rules, modifying one or more of those rules to generate a conforming user interface from (e.g., based directly or indirectly on) those one or more rules, and/or generating a conforming user interface from those one or more rules. The method further calls for storing to and/or generating as an output from the digital data processing system a result those step(s).

42 Claims, 3 Drawing Sheets

(56) References Cited

U.S. PATENT DOCUMENTS

| | | |
|---|---|---|
| 4,930,071 A | 5/1990 | Tou et al. |
| 4,953,106 A | 8/1990 | Gansner et al. |
| 5,062,060 A * | 10/1991 | Kolnick .................. 715/800 |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,678,039 A | 10/1997 | Hinks et al. |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,832,483 A | 11/1998 | Barker |
| 5,841,673 A | 11/1998 | Kobayashi et al. |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,907,490 A | 5/1999 | Oliver |
| 5,907,837 A | 5/1999 | Ferrel et al. |
| 5,910,748 A | 6/1999 | Reffay et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,105,035 A | 8/2000 | Monge et al. |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,300,947 B1 | 10/2001 | Kanevsky |
| 6,308,163 B1 | 10/2001 | Du et al. |

(56) References Cited

U.S. PATENT DOCUMENTS

| | | | |
|---|---|---|---|
| 6,314,415 | B1 | 11/2001 | Mukherjee |
| 6,324,693 | B1 | 11/2001 | Brodersen et al. |
| 6,330,554 | B1 | 12/2001 | Altschuler et al. |
| 6,338,074 | B1 | 1/2002 | Poindexter et al. |
| 6,341,277 | B1 | 1/2002 | Coden et al. |
| 6,341,293 | B1 | 1/2002 | Hennessey |
| 6,349,238 | B1 | 2/2002 | Gabbita et al. |
| 6,351,734 | B1 | 2/2002 | Lautzenheiser et al. |
| 6,359,633 | B1 | 3/2002 | Balasubramaniam et al. |
| 6,369,819 | B1 | 4/2002 | Pitkow et al. |
| 6,380,910 | B1 | 4/2002 | Moustakas et al. |
| 6,381,738 | B1 | 4/2002 | Choi et al. |
| 6,389,460 | B1 | 5/2002 | Stewart et al. |
| 6,393,605 | B1 | 5/2002 | Loomans |
| 6,396,885 | B1 | 5/2002 | Ding et al. |
| 6,405,211 | B1 | 6/2002 | Sokol et al. |
| 6,405,251 | B1 | 6/2002 | Bullard et al. |
| 6,415,259 | B1 | 7/2002 | Wolfinger et al. |
| 6,415,283 | B1 | 7/2002 | Conklin |
| 6,418,448 | B1 | 7/2002 | Sarkar |
| 6,426,723 | B1 | 7/2002 | Smith et al. |
| 6,429,870 | B1 | 8/2002 | Chen et al. |
| 6,437,799 | B1 | 8/2002 | Shinomi et al. |
| 6,446,089 | B1 | 9/2002 | Brodersen et al. |
| 6,446,200 | B1 | 9/2002 | Ball et al. |
| 6,446,256 | B1 | 9/2002 | Hyman et al. |
| 6,448,964 | B1 | 9/2002 | Isaacs et al. |
| 6,463,440 | B1 | 10/2002 | Hind et al. |
| 6,473,467 | B1 | 10/2002 | Wallace et al. |
| 6,473,748 | B1 | 10/2002 | Archer |
| 6,493,331 | B1 | 12/2002 | Walton et al. |
| 6,493,399 | B1 | 12/2002 | Xia et al. |
| 6,493,754 | B1 | 12/2002 | Rosborough et al. |
| 6,496,812 | B1 | 12/2002 | Campaigne et al. |
| 6,496,833 | B1 | 12/2002 | Goldberg et al. |
| 6,502,239 | B2 | 12/2002 | Zgarba et al. |
| 6,509,898 | B2 | 1/2003 | Chi et al. |
| 6,513,018 | B1 | 1/2003 | Culhane |
| 6,526,440 | B1 | 2/2003 | Bharat |
| 6,526,457 | B1 | 2/2003 | Birze |
| 6,529,899 | B1 | 3/2003 | Kraft et al. |
| 6,530,079 | B1 | 3/2003 | Choi et al. |
| 6,539,374 | B2 | 3/2003 | Jung |
| 6,542,912 | B2 | 4/2003 | Meltzer et al. |
| 6,546,406 | B1 | 4/2003 | DeRose et al. |
| 6,549,904 | B1 | 4/2003 | Ortega et al. |
| 6,556,983 | B1 | 4/2003 | Altschuler et al. |
| 6,556,985 | B1 | 4/2003 | Karch |
| 6,560,592 | B1 | 5/2003 | Reid et al. |
| 6,567,419 | B1 | 5/2003 | Yarlagadda |
| 6,571,222 | B1 | 5/2003 | Matsumoto et al. |
| 6,577,769 | B1 | 6/2003 | Kenyon et al. |
| 6,583,800 | B1 | 6/2003 | Ridgley et al. |
| 6,584,464 | B1 | 6/2003 | Warthen |
| 6,584,569 | B2 | 6/2003 | Reshef et al. |
| 6,594,662 | B1 | 7/2003 | Sieffert et al. |
| 6,597,775 | B2 | 7/2003 | Lawyer et al. |
| 6,598,043 | B1 | 7/2003 | Baclawski |
| 6,606,613 | B1 | 8/2003 | Altschuler et al. |
| 6,625,657 | B1 | 9/2003 | Bullard |
| 6,629,138 | B1 | 9/2003 | Lambert et al. |
| 6,636,850 | B2 | 10/2003 | Lepien |
| 6,636,901 | B2 | 10/2003 | Sudhakaran et al. |
| 6,643,638 | B1 | 11/2003 | Xu |
| 6,643,652 | B2 | 11/2003 | Helgeson et al. |
| 6,661,908 | B1 | 12/2003 | Suchard et al. |
| 6,678,679 | B1 | 1/2004 | Bradford |
| 6,678,773 | B2 | 1/2004 | Marietta et al. |
| 6,678,882 | B1 | 1/2004 | Hurley et al. |
| 6,684,261 | B1 | 1/2004 | Orton et al. |
| 6,691,067 | B1 | 2/2004 | Ding et al. |
| 6,691,230 | B1 | 2/2004 | Bardon |
| 6,701,314 | B1 | 3/2004 | Conover et al. |
| 6,711,565 | B1 | 3/2004 | Subramaniam et al. |
| 6,721,747 | B2 | 4/2004 | Lipkin |
| 6,728,702 | B1 | 4/2004 | Subramaniam et al. |
| 6,728,852 | B1 | 4/2004 | Stoutamire |
| 6,732,095 | B1 | 5/2004 | Warshavsky et al. |
| 6,732,111 | B2 | 5/2004 | Brodersen et al. |
| 6,748,422 | B2 | 6/2004 | Morin et al. |
| 6,750,858 | B1 | 6/2004 | Rosenstein |
| 6,751,663 | B1 | 6/2004 | Farrell et al. |
| 6,754,475 | B1 | 6/2004 | Harrison et al. |
| 6,756,994 | B1 | 6/2004 | Tlaskal |
| 6,763,351 | B1 | 7/2004 | Subramaniam et al. |
| 6,771,706 | B2 | 8/2004 | Ling et al. |
| 6,772,148 | B2 | 8/2004 | Baclawski |
| 6,772,350 | B1 | 8/2004 | Belani et al. |
| 6,778,971 | B1 | 8/2004 | Altschuler et al. |
| 6,782,091 | B1 | 8/2004 | Dunning, III |
| 6,785,341 | B2 | 8/2004 | Walton et al. |
| 6,788,114 | B1 | 9/2004 | Krenzke et al. |
| 6,792,420 | B2 | 9/2004 | Stephen Chen et al. |
| RE38,633 | E | 10/2004 | Srinivasan |
| 6,804,330 | B1 | 10/2004 | Jones et al. |
| 6,820,082 | B1 | 11/2004 | Cook et al. |
| 6,829,655 | B1 | 12/2004 | Huang et al. |
| 6,831,668 | B2 | 12/2004 | Cras et al. |
| 6,839,682 | B1 | 1/2005 | Blume et al. |
| 6,847,982 | B2 | 1/2005 | Parker et al. |
| 6,851,089 | B1 | 2/2005 | Erickson et al. |
| 6,856,575 | B2 | 2/2005 | Jones |
| 6,856,992 | B2 | 2/2005 | Britton et al. |
| 6,859,787 | B2 | 2/2005 | Fisher et al. |
| 6,865,546 | B1 | 3/2005 | Song |
| 6,865,566 | B2 | 3/2005 | Serrano-Morales et al. |
| 6,865,575 | B1 | 3/2005 | Smith et al. |
| 6,867,789 | B1 | 3/2005 | Allen et al. |
| 6,918,222 | B2 | 7/2005 | Lat et al. |
| 6,920,615 | B1 | 7/2005 | Campbell et al. |
| 6,925,457 | B2 | 8/2005 | Britton et al. |
| 6,927,728 | B2 | 8/2005 | Vook et al. |
| 6,934,702 | B2 | 8/2005 | Faybishenko et al. |
| 6,940,917 | B2 | 9/2005 | Menon et al. |
| 6,944,644 | B2 | 9/2005 | Gideon |
| 6,954,737 | B2 | 10/2005 | Kalantar et al. |
| 6,956,845 | B2 | 10/2005 | Baker et al. |
| 6,959,432 | B2 | 10/2005 | Crocker |
| 6,961,725 | B2 | 11/2005 | Yuan et al. |
| 6,965,889 | B2 | 11/2005 | Serrano-Morales et al. |
| 6,976,144 | B1 | 12/2005 | Trefler et al. |
| 6,985,912 | B2 | 1/2006 | Mullins et al. |
| 7,020,869 | B2 | 3/2006 | Abrari et al. |
| 7,028,225 | B2 | 4/2006 | Maso et al. |
| 7,031,901 | B2 | 4/2006 | Abu El Ata |
| 7,058,367 | B1 | 6/2006 | Luo et al. |
| 7,058,637 | B2 | 6/2006 | Britton et al. |
| 7,064,766 | B2 | 6/2006 | Beda et al. |
| 7,073,177 | B2 | 7/2006 | Foote et al. |
| 7,076,558 | B1 | 7/2006 | Dunn |
| 7,089,193 | B2 | 8/2006 | Newbold |
| 7,103,173 | B2 | 9/2006 | Rodenbusch et al. |
| 7,124,145 | B2 | 10/2006 | Surasinghe |
| 7,139,999 | B2 | 11/2006 | Bowman-Amuah |
| 7,143,116 | B2 | 11/2006 | Okitsu et al. |
| 7,171,145 | B2 | 1/2007 | Takeuchi et al. |
| 7,171,415 | B2 | 1/2007 | Kan et al. |
| 7,174,514 | B2 | 2/2007 | Subramaniam et al. |
| 7,289,793 | B2 | 10/2007 | Norwood et al. |
| RE39,918 | E | 11/2007 | Slemmer |
| 7,302,417 | B2 | 11/2007 | Iyer |
| 7,318,020 | B1 | 1/2008 | Kim |
| 7,318,066 | B2 | 1/2008 | Kaufman et al. |
| 7,334,039 | B1 | 2/2008 | Majkut et al. |
| 7,353,229 | B2 | 4/2008 | Vilcauskas, Jr. et al. |
| 7,406,475 | B2 | 7/2008 | Dorne et al. |
| 7,412,388 | B2 | 8/2008 | Dalal et al. |
| 7,505,827 | B1 | 3/2009 | Boddy et al. |
| 7,536,294 | B1 | 5/2009 | Stanz et al. |
| 7,555,645 | B2 | 6/2009 | Vissapragada |
| 7,574,494 | B1 | 8/2009 | Mayernick et al. |
| 7,596,504 | B2 | 9/2009 | Hughes et al. |
| 7,640,222 | B2 | 12/2009 | Trefler |
| 7,665,063 | B1 | 2/2010 | Hofmann et al. |

(56) References Cited

U.S. PATENT DOCUMENTS

| | | |
|---|---|---|
| 7,711,919 B2 | 5/2010 | Trefler et al. |
| 7,779,395 B1 | 8/2010 | Chotin et al. |
| 7,844,594 B1 | 11/2010 | Holt et al. |
| 7,937,690 B2 | 5/2011 | Casey |
| 7,983,895 B2 | 7/2011 | McEntee et al. |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,479,157 B2 | 7/2013 | Trefler et al. |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0073337 A1 | 6/2002 | Ioele et al. |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0184610 A1 | 12/2002 | Chong et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Schuetze et al. |
| 2003/0084401 A1 | 5/2003 | Abel et al. |
| 2003/0109951 A1 | 6/2003 | Hsiung et al. |
| 2003/0135358 A1 | 7/2003 | Lissauer et al. |
| 2003/0191626 A1 | 10/2003 | Al-Onaizan et al. |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0054610 A1 | 3/2004 | Amstutz et al. |
| 2004/0064552 A1 | 4/2004 | Chong et al. |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0145607 A1* | 7/2004 | Alderson ............... 345/746 |
| 2004/0147138 A1 | 7/2004 | Vaartstra |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0104628 A1 | 5/2005 | Tanzawa et al. |
| 2005/0125683 A1 | 6/2005 | Matsuyama et al. |
| 2005/0138162 A1 | 6/2005 | Byrnes |
| 2005/0165823 A1 | 7/2005 | Ondrusek et al. |
| 2005/0216235 A1 | 9/2005 | Butt et al. |
| 2005/0234882 A1 | 10/2005 | Bennett et al. |
| 2005/0288920 A1 | 12/2005 | Green et al. |
| 2006/0004845 A1* | 1/2006 | Kristiansen et al. ...... 707/103 R |
| 2006/0020783 A1 | 1/2006 | Fisher |
| 2006/0041861 A1 | 2/2006 | Trefler et al. |
| 2006/0063138 A1 | 3/2006 | Loff et al. |
| 2006/0064486 A1 | 3/2006 | Baron et al. |
| 2006/0080082 A1 | 4/2006 | Ravindra et al. |
| 2006/0100847 A1 | 5/2006 | McEntee et al. |
| 2006/0139312 A1 | 6/2006 | Sinclair et al. |
| 2006/0149751 A1* | 7/2006 | Jade et al. ............... 707/100 |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0218166 A1 | 9/2006 | Myers et al. |
| 2006/0271920 A1 | 11/2006 | Abouelsaadat |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0203756 A1 | 8/2007 | Sears et al. |
| 2007/0208553 A1 | 9/2007 | Hastings et al. |
| 2007/0233902 A1 | 10/2007 | Trefler et al. |
| 2007/0239646 A1 | 10/2007 | Trefler |
| 2007/0260584 A1 | 11/2007 | Marti et al. |
| 2007/0294644 A1 | 12/2007 | Yost |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0184230 A1 | 7/2008 | Leech et al. |
| 2008/0195377 A1 | 8/2008 | Kato et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2009/0075634 A1 | 3/2009 | Sinclair et al. |
| 2009/0132232 A1 | 5/2009 | Trefler |
| 2009/0150541 A1 | 6/2009 | Georgis |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0276206 A1 | 11/2009 | Fitzpatrick et al. |
| 2010/0088266 A1 | 4/2010 | Trefler |
| 2010/0107137 A1 | 4/2010 | Trefler et al. |
| 2010/0217737 A1 | 8/2010 | Shama |
| 2012/0041921 A1 | 2/2012 | Canaday et al. |
| 2013/0007267 A1 | 1/2013 | Khatutsky |
| 2013/0231970 A1 | 9/2013 | Trefler et al. |
| 2014/0019400 A1 | 1/2014 | Trefler et al. |

FOREIGN PATENT DOCUMENTS

| | | |
|---|---|---|
| EP | 0 669 717 A1 | 8/1995 |
| EP | 0 996 916 A1 | 5/2000 |
| EP | 1 015 997 A2 | 7/2000 |
| EP | 1 019 807 A2 | 7/2000 |

(56) References Cited

FOREIGN PATENT DOCUMENTS

| | | |
|---|---|---|
| EP | 1 073 955 A1 | 2/2001 |
| EP | 1 073 992 A1 | 2/2001 |
| EP | 1 135 723 A1 | 9/2001 |
| EP | 1 163 604 A2 | 12/2001 |
| EP | 1 183 636 A1 | 3/2002 |
| EP | 1 196 882 A1 | 4/2002 |
| EP | 1 203 310 A1 | 5/2002 |
| EP | 1 208 482 A1 | 5/2002 |
| EP | 1 212 668 A2 | 6/2002 |
| EP | 1 240 592 A1 | 9/2002 |
| EP | 1 277 102 A2 | 1/2003 |
| EP | 1 277 119 A1 | 1/2003 |
| EP | 1 277 120 A1 | 1/2003 |
| EP | 1 277 153 A1 | 1/2003 |
| EP | 1 277 155 A1 | 1/2003 |
| EP | 1 277 329 A1 | 1/2003 |
| EP | 1 374 083 A1 | 1/2004 |
| EP | 1 382 030 A2 | 1/2004 |
| EP | 1 386 241 A1 | 2/2004 |
| EP | 1 393 172 A2 | 3/2004 |
| EP | 1 393 188 A1 | 3/2004 |
| EP | 1 402 336 A2 | 3/2004 |
| EP | 1 407 384 A1 | 4/2004 |
| EP | 1 430 396 A1 | 6/2004 |
| EP | 1 438 649 A1 | 7/2004 |
| EP | 1 438 654 A1 | 7/2004 |
| EP | 1 438 672 A1 | 7/2004 |
| EP | 1 483 685 A1 | 12/2004 |
| EP | 1 490 747 A1 | 12/2004 |
| EP | 1 490 809 A1 | 12/2004 |
| EP | 1 492 232 A1 | 12/2004 |
| EP | 1 782 183 A2 | 5/2007 |
| EP | 1 830 312 A1 | 9/2007 |
| EP | 1 840 803 A1 | 10/2007 |
| EP | 2 115 581 A1 | 11/2009 |
| WO | WO-98/38564 A2 | 9/1998 |
| WO | WO-98/40807 A2 | 9/1998 |
| WO | WO-99/05632 A1 | 2/1999 |
| WO | WO-99/45465 A1 | 9/1999 |
| WO | WO-99/50784 A1 | 10/1999 |
| WO | WO-00/33187 A1 | 6/2000 |
| WO | WO-00/33217 A1 | 6/2000 |
| WO | WO-00/33226 A1 | 6/2000 |
| WO | WO-00/33235 A1 | 6/2000 |
| WO | WO-00/33238 A2 | 6/2000 |
| WO | WO-00/52553 A2 | 9/2000 |
| WO | WO-00/52603 A1 | 9/2000 |
| WO | WO-01/40958 A1 | 6/2001 |
| WO | WO-01/75610 A1 | 10/2001 |
| WO | WO-01/75614 A1 | 10/2001 |
| WO | WO-01/75747 A1 | 10/2001 |
| WO | WO-01/75748 A1 | 10/2001 |
| WO | WO-01/76206 A1 | 10/2001 |
| WO | WO-01/77787 A2 | 10/2001 |
| WO | WO-01/79994 A2 | 10/2001 |
| WO | WO-02/21254 A2 | 3/2002 |
| WO | WO-02/44947 A2 | 6/2002 |
| WO | 02/056249 A2 | 7/2002 |
| WO | WO-02/080006 A1 | 10/2002 |
| WO | WO-02/080015 A1 | 10/2002 |
| WO | WO-02/082300 A1 | 10/2002 |
| WO | WO-02/084925 A2 | 10/2002 |
| WO | WO-02/088869 A2 | 11/2002 |
| WO | WO-02/091346 A1 | 11/2002 |
| WO | WO-02/101517 A1 | 12/2002 |
| WO | WO-02/103576 A1 | 12/2002 |
| WO | WO-03/021393 A2 | 3/2003 |
| WO | WO-03/029923 A2 | 4/2003 |
| WO | WO-03/029955 A1 | 4/2003 |
| WO | WO-03/030005 A1 | 4/2003 |
| WO | WO-03/030013 A1 | 4/2003 |
| WO | WO-03/030014 A1 | 4/2003 |
| WO | WO-03/058504 A1 | 7/2003 |
| WO | WO-03/069500 A1 | 8/2003 |
| WO | WO-03/071380 A2 | 8/2003 |
| WO | WO-03/071388 A2 | 8/2003 |
| WO | WO-03/073319 A1 | 9/2003 |
| WO | WO-03/077139 A1 | 9/2003 |
| WO | WO-03/085503 A1 | 10/2003 |
| WO | WO-03/085580 A1 | 10/2003 |
| WO | WO-2004/001613 A1 | 12/2003 |
| WO | WO-2004/003684 A2 | 1/2004 |
| WO | WO-2004/003766 A1 | 1/2004 |
| WO | WO-2004/003885 A1 | 1/2004 |
| WO | WO-2004/046882 A2 | 6/2004 |
| WO | WO-2004/061815 A1 | 7/2004 |
| WO | WO-2004/086197 A2 | 10/2004 |
| WO | WO-2004/086198 A2 | 10/2004 |
| WO | WO-2004/095207 A2 | 11/2004 |
| WO | WO-2004/095208 A2 | 11/2004 |
| WO | WO-2004/114147 A1 | 12/2004 |
| WO | WO-2005/001627 A2 | 1/2005 |
| WO | WO-2005/003888 A2 | 1/2005 |
| WO | WO-2005/010645 A2 | 2/2005 |
| WO | WO-2005/117549 A2 | 12/2005 |
| WO | WO-2006/081536 A2 | 8/2006 |
| WO | 2007/033922 A2 | 3/2007 |
| WO | WO-2008/109441 A1 | 9/2008 |
| WO | WO-2009/097384 A1 | 8/2009 |

OTHER PUBLICATIONS

[No Author Listed] FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.

[No Author Listed] "How SmartForms for Fair Blaze Advisor works", Fair Issac White Paper, http://www.FAIRISAAC.COM/, Oct. 31, 2005.

Bertino and P. Foscoli, "Index Organizations for Object-Oriented Database Systems," IEEE Trans. on Knowledge and Data Engineering, 7(2):193-209 (1995).

Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.

Burleson, "Adding behaviors to relational databases," DBMS, 8(10): 68(5) (1995).

Busse, Ralph et al., "Declarative and Procedural Object Oriented Views", 1998, IEEE retrieved Mar. 22, 2007.

Buyya et al., "Economic Models for Resource Management and Scheduling in Grid Computing," 2002. Concurrency and Computation: Practice and Experience. vol. 14. pp. 1507-1542.

Chan and W. Hwang, "Towards Integrating Logic, Object, Frame, and Production," Proc. Fourth Int'l. Conf. on Software Engineering and Knowledge Engineering, pp. 463-469, Jun. 1992.

Cheng, Cheng-Chung; Smith, Stephen F.; "A Constraint Satisfaction Approach to Makespan Scheduling," AIPS 1996 Proceedings, pp. 45-52 (1996).

Cheng and Smith, "Applying Constraint Satisfaction Techniques to Job Shop Scheduling," 1997. Annals of Operations Research. 70: 327-357 (1997).

Cochrane, Roberta et al., "Integrating Triggers and Declarative Constraints in SQL", p. 567-578, Proceedings of the 22nd VLDB Conference Mumbai (Bombay), India, 1996, retrieved Mar. 22, 2007.

Danforth, "Integrating Object and Relational Technologies," Proc. Sixteenth Annual Int'l. Computer Software and Applications Conf., pp. 225-226, Sep. 1992 (abstract).

DeMichiel, et al., "Polyglot: Extensions to Relational Databases for Sharable Types and Functions in a Multi-Language Environment," Proc. Ninth Int'l. Conf. on Data Engineering, pp. 651-660, Apr. 1993.

Communication for European Patent Application No. 05755530.2, dated Sep. 6, 2007.

European Search Report for Application No. 05755530.2, dated Mar. 26, 2012 (3 Pages).

Communication for European Patent Application No. 07250844.3 enclosing European Search Report, dated Jul. 11, 2007.

Communication for European Patent Application No. 07250844.3, dated Mar. 28, 2008.

Communication for European Patent Application No. 07250848.4, dated Aug. 13, 2007 (EESR enclosed).

(56) References Cited

OTHER PUBLICATIONS

Communication for European Patent Application No. 07250848.4, dated May 29, 2008.
Communication for European Patent Application No. 08731127.0, dated Oct. 13, 2009.
Francisco, S. et al. "Rule-Based Web Page Generation" Proceedings of the 2nd Workshop on Adaptive Hypertext and Hypermedia, Hypertext'98, Jun. 20-24, 1998.
International Search Report for PCT/US05/018599, dated May 15, 2007.
International Preliminary Report on Patentability for PCT/US2005/018599, dated Jun. 5, 2007.
International Search Report & Written Opinion for PCT/US06/03160, mailed Jul. 21, 2008.
International Preliminary Report on Patentability for PCT/US06/03160, dated Apr. 9, 2009.
International Search Report for PCT/US08/55503, mailed Jul. 28, 2008.
International Preliminary Report on Patentability for PCT/US2008/05503, mailed Sep. 17, 2009.
International Search Report & Written Opinion for PCT/US09/32341, mailed Mar. 11, 2009.
International Preliminary Report on Patentability for PCT/US2009/032341, mailed Aug. 12, 2010.
Jones et al., A user-centered approach to functions in excel. International Conference on Functional Programming, Uppsala, Jun. 30, 2003, pp. 1-12.
Kim, "Object-Oriented Databases: Definition and Research Directions," IEEE Trans. on Knowledge and Data Engineering, vol. 2(3) pp. 327-341, Sep. 1990.
Kuhn, H.W. "The Hungarian Method for the Assignment Problem," Naval Research Logistics Quarterly, 2 (1955), pp. 83-97.
Kuno and E.A. Rundensteiner, "Augmented Inherited Multi-Index Structure for Maintenance of Materialized Path Query Views," Proc. Sixth Int'l. Workshop on Research Issues in Data Engineering, pp. 128-137, Feb. 1996.
Lippert, Eric, "Fabulous Adventures in Coding: Metaprogramming, Toast and the Future of Development Tools," Microsoft.com Blog, MSDN Home, published Mar. 4, 2004, 6 pgs.
Manghi, Paolo et. al. "Hybrid Applications Over XML: Integrating the Procedural and Declarative Approaches", 2002 ACM, pp. 1-6. Retrieved Mar. 22, 2007.
Markowitz and A. Shoshani, "Object Queries over Relational Databases: Language, Implementation, and Applications," IEEE Xplore, pp. 71-80, Apr. 1993.
Maryanski, et al., "The Data Model Compiler: A Tool for Generating Object-Oriented Database Systems," 1986 Int'l. Workshop on Object-Oriented Database Systems, 73-84 (1986).
McConnell, Steven C., "Brooks' Law Repealed," IEEE Software, pp. 6-9, Nov./Dec. 1999.
Mecca, G. et al. "Cut and Paste", ACM, pp. 1-25 and Appendix I-IV (1999). Retrieved Mar. 22, 2007.
Morizet-Mahoudeaux, "A Hierarchy of Network-Based Knowledge Systems," IEEE Trans. on Systems, Man, and Cybernetics, vol. 21(5), pp. 1184-1191, Sep. 1991.
Reinersten, Don, "Is It Always a Bad Idea to Add Resources to a Late Project?," Oct. 30, 2000. Electronic Design. vol. 48, Issue 22, p. 70.
Riccuiti, M., Oracle 8.0 on the way with objects: upgrade will also build in multidimensional engine. InfoWorld. Sep. 25, 1995;17(39):16.
Salvini and M.H. Williams, "Knowledge Management for Expert Systems," IEE Colloquium on 'Knowledge Engineering', 3 pages, May 1990.
Schiefelbein, Mark A Backbase Ajax Front-end for J2EE Applications, Internet Article, http://dev2dev.bea.com/1pt/a/433>, Aug. 29, 2005.
Sellis, et al., "Coupling Production Systems and Database Systems: A Homogeneous Approach," IEEE Trans. on Knowledge and Data Engineering, vol. 5(2), pp. 240-256, Apr. 1993.
Shyy and S.Y.W. Su, "Refinement Preservation for Rule Selection in Active Object-Oriented Database Systems," Proc. Fourth Int'l. Workshop on Research Issues in Data Engineering, pp. 115-123, Feb. 1994.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.
Stonebraker, "The Integration of Rule Systems and Database Systems," IEEE Trans. on Knowledge and Data Engineering, vol. 4(5), pp. 415-423, Oct. 1992.
Sun, et al., "Supporting Inheritance in Relational Database Systems," IEEE, pp. 511-518, Jun. 1992.
Thuraisingham, "From Rules to Frames and Frames to Rules," AI Expert, pp. 31-39, Oct. 1989.
Vranes, S. "Integrating Multiple Paradigms within the Blackboard Framework," IEEE Transactions on Software Engineering, vol. 21, No. 3, Mar. 1995, pp. 244-262.
Yang, Bibo; Geunes, Joseph; O'Brien, William J.; "Resource-Constrained Project Scheduling: Past Work and New Directions," Apr. 2001.
Damerau, F.J., Problems and some solutions in customization of natural language database front ends. ACM Transactions on Information Systems, vol. 3, No. 2, Apr. 1, 1985, pp. 165-184.
European Office Action issued Aug. 31, 2012 for Application No. 05755530.2 (4 Pages).
European Office Action issued Jul. 9, 2012 for Application No. 07250844.3 (8 Pages).
Johnson et al., Sharing and resuing rules—a feature comparison of five expert system shells. IEEE Expert, IEEE Services Center, New York, NY, vol. 9, No. 3, Jun. 1, 1994, pp. 3-17.
[No Author Listed] Solaris 9 resource manager software. A technical white paper. Sun Microsystems, Inc., Palo Alto CA, 2002, 37 pages. XP-002291080. Retrieved Aug. 3, 2004 from <http://wwws.sun.com/software/whitepapers/solaris9/srm.pdf>.
Devarakonda et al., Predictability of process resource usage: A measurement-based study on UNIX. IEEE Transactions on Software Engineering. 1989;15(12):1579-1586.
Extended European Search Report issued Oct. 29, 2012 for Application No. 08731127.0 (8 Pages).

* cited by examiner

RULE-BASED USER INTERFACE CONFORMANCE METHODS

REFERENCE TO RELATED APPLICATIONS

This application is a continuation in part of U.S. patent application Ser. No. 12/174,624, filed Jul. 16, 2008, entitled "Methods and Apparatus for Implementing Multilingual Software Applications," which claims the benefit of priority of U.S. Patent Application Ser. No. 61/063,269, filed Jan. 31, 2008, entitled "Digital Data Processing Methods and Apparatus for Business Process Management." This application is also a continuation in part of U.S. patent application Ser. No. 12/035,682, filed Feb. 22, 2008, entitled "User Interface Methods and Apparatus for Rules Processing," which is a continuation-in-part of U.S. patent application Ser. No. 11/396,415, filed Mar. 30, 2006, entitled "User Interface Methods and Apparatus for Rules Processing." The teachings of all of the forgoing are incorporated herein by reference.

BACKGROUND OF THE INVENTION

The invention relates to digital data processing and, more particularly, for example, to more to the optimization of user interfaces generated by digital data processing systems.

Computer systems that facilitate business operations based on information specific to an industry or enterprise are well known in the art. These typically rely on rules identifying situations that are expected to arise during enterprise operation and the applicable responses. Such systems have been used in a range of applications, from health care to automotive repair. The rules on which they rely come from experts in the field, from the collective experience of workers on the "front line," or a combination of these and other sources.

Though many computer systems of this sort incorporate application-specific knowledge directly into source code (using, for example, a sequence of "if . . . then . . . else" statements, or the like), more complex systems store that knowledge separately from the programs that access it. Some use "rules bases" that store application-specific information in tables, database records, database objects, and so forth. An example of a system of this type is disclosed in commonly assigned U.S. Pat. No. 5,826,250, entitled "Rules Bases and Methods of Access Thereof," the teachings of which are incorporated herein by reference.

These and other rules-based business process management (BPM) applications are commonly used in enterprise computing, for example, where they facilitate a range of business operations, from marketing to manufacturing to distribution to technical support. By way of example, a BPM application can implement data-processing workflows to support the handling of customer service requests received by retail and banking enterprises. By way of further example, BPM applications can be used in health care and insurance enterprises to support the automated routing and resolution of claims.

With increasing frequency, these applications are implemented with architectures that permit their use over the Internet, wide area networks, local area networks, and the like. A common such architecture provides a rules engine that executes on a server, e.g., co-located with the rules base at enterprise headquarters, and that processes requests entered by support personnel via web browsers executing on remotely disposed client devices (e.g., personal computers and personal digital assistants).

Other software applications are evolving similarly. Those that traditionally ran solely on the "desktop," are now increasingly being executed over the Internet or other networks. Word processing is one example. Though core functions are still supported by software resident on each user's computer, higher-end functionality may be delivered on demand from an enterprise or other server.

Unfortunately, the architectural evolution of BPM and other applications has not been accompanied by commensurate changes in their user interfaces. Customers must increasingly rely on those interfaces for everything from opening inquiries, to making purchases and entering into other transactions, to obtaining customer assistance. Enterprise employees and managers must likewise increasingly rely on them for everything from account inquires, to report generation, to customer and account support. Though the quantity of information pouring into and out of these user interfaces is on the rise, their efficiency and ease of use is not. An object of this invention is to correct that.

More generally, an object of the invention is to provide improved systems and methods for digital data processing.

A more particular object is to provide improved user interface systems and methods.

A yet more particular object is to provide such improved user interface systems and methods for use with rules engines.

A still yet more particular object is to provide such improved user interface systems and methods for use in business process management (BPM) applications.

A yet still further object is to provide such improved user interface systems and methods as are optimized for user interaction.

SUMMARY OF THE INVENTION

The foregoing are among the objects attained by the invention, which provides in some aspects methods and systems for user interface optimization. In one such aspect, the invention provides such a method that includes identifying one or more rules for execution by a rules engine in order to generate a user interface. The method further includes executing, on a digital data processing system that comprises one or more digital data processors, a step of determining whether one or more aspects of the user interface generated as a result of execution of at least one of those rules is in conformity with one or more requirements. The system responds to a negative such determination by generating a notification indicative thereof, identifying modifications to generate a conforming user interface from those one or more rules, modifying one or more of those rules to generate a conforming user interface, and/or generating a conforming user interface from (e.g., based directly or indirectly on) those one or more rules. The method further calls for storing to and/or generating as an output from the digital data processing system a result those step(s).

Further aspects of the invention provide methods, e.g., as described above, wherein one or more of the rules comprises any of metadata and one or more programming language statements.

Further aspects of the invention provide methods, e.g., as described above, wherein aspects of the user interface in regard to which the determination of conformity is made pertain to a language syntax of the user interface, including any of grammar, spelling, usage, punctuation, and style; accessibility of the user interface by disabled users; amenability of the user interface to localization/globalization; the need for localizing/globalizing the user interface; security; and/or layout.

Thus, by way of non-limiting example, methods according to related aspects of the invention can make a determination of whether the user interface provides tooltips in conformity with specified accessibility requirements. And, by way of further non-limiting example, such methods can make a determination of whether the user interface obfuscates one or more fields (e.g., input and/or display fields) in accord with specified security requirements.

By way of still further example, methods according to related aspects of the invention can make a determination of whether the user interface meets specified layout requirements in regard to priority of fields, color contrast, whitespace, alignment, field and/or element labels, redundancy, progress indicators, usability, unused area and/or display resolution.

Further aspects of the invention provide methods, e.g., as described above, wherein one or more of the requirements from which the conformity determination is made are defined by one or more further rules (e.g., from a rules base) and/or another user interface generated thereby, one or more transactional data (e.g., from one or more enterprise databases) relating to the user interface or otherwise, a context in which the user interface is any of transmitted, displayed and/or viewed by the user, a collection (e.g., database, rules base or otherwise) defining any of grammar, spelling, usage, punctuation, style of the user interface.

Still further aspects of the invention provide methods, e.g., as described above, wherein one or more of the user requirements are defined in accord with transactional data relating to a field associated with the user interface. According to such aspects, for example, the conforming user interface can include a field that has a modified display characteristic vis-a-vis a non-conforming user interface which would otherwise result from the rule(s) upon which the determination of non-conformance is made.

Related aspects of the invention provide methods, e.g., as described above, wherein the modified display characteristic is based on a requirement defined in accord with transactional data relating to correlation between transactional data associated with that field and transactional data associated with another field. The modified display characteristic can be, for example, position, size, color and/or other attribute.

Further aspects of the invention provide methods, e.g., as described above, wherein a field in a conforming user interface includes a field that is repositioned vis-a-vis the non-conforming user interface which would otherwise result from the rule(s) upon which the determination of non-conformance is made. According to related aspects of the invention, a location of that repositioned field is based on a location of another field in the user interface. Alternatively, or in addition, according to related aspects of the invention, that location can be based on a preferred position for the repositioned field, e.g., as defined in one or more other rules and/or a context in which the user interface is any of transmitted, displayed and/or viewed by a user—all by way of example.

Further aspects of the invention provide methods, e.g., as described above, wherein a field of a conforming user interface is any of added to and removed from the user interface vis-a-vis the non-conforming user interface which would otherwise result from the rule(s) upon which the determination of non-conformance is made.

Yet still further aspects of the invention provide methods, e.g., as described above, wherein a conforming user interface includes a field that that has a modified display characteristic vis-a-vis the non-conforming user interface which would otherwise result from the rule(s) upon which the determination of non-conformance is made.

Other related aspects of the invention provide methods, e.g., as described above, wherein the requirement pertains to an alignment characteristic and wherein the conforming user interface includes an altered alignment characteristic vis-a-vis the non-conforming user interface which would otherwise result from the rule(s) upon which the determination of non-conformance is made.

Still other related aspects provide methods, e.g., as described above, wherein the requirement pertains to a security trait and wherein the conforming user interface includes a feature that obfuscates at least one display or input field vis-a-vis the non-conforming user interface which would otherwise result from the rule(s) upon which the determination of non-conformance is made.

Likewise, for example, wherein the requirement pertains to the display of "breadcrumbs," tabs or other navigational indicators of user interfaces, the conforming user interface can include a feature reflecting such indicators vis-a-vis the non-conforming user interface which would otherwise result from the rule(s) upon which the determination of non-conformance is made.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1:
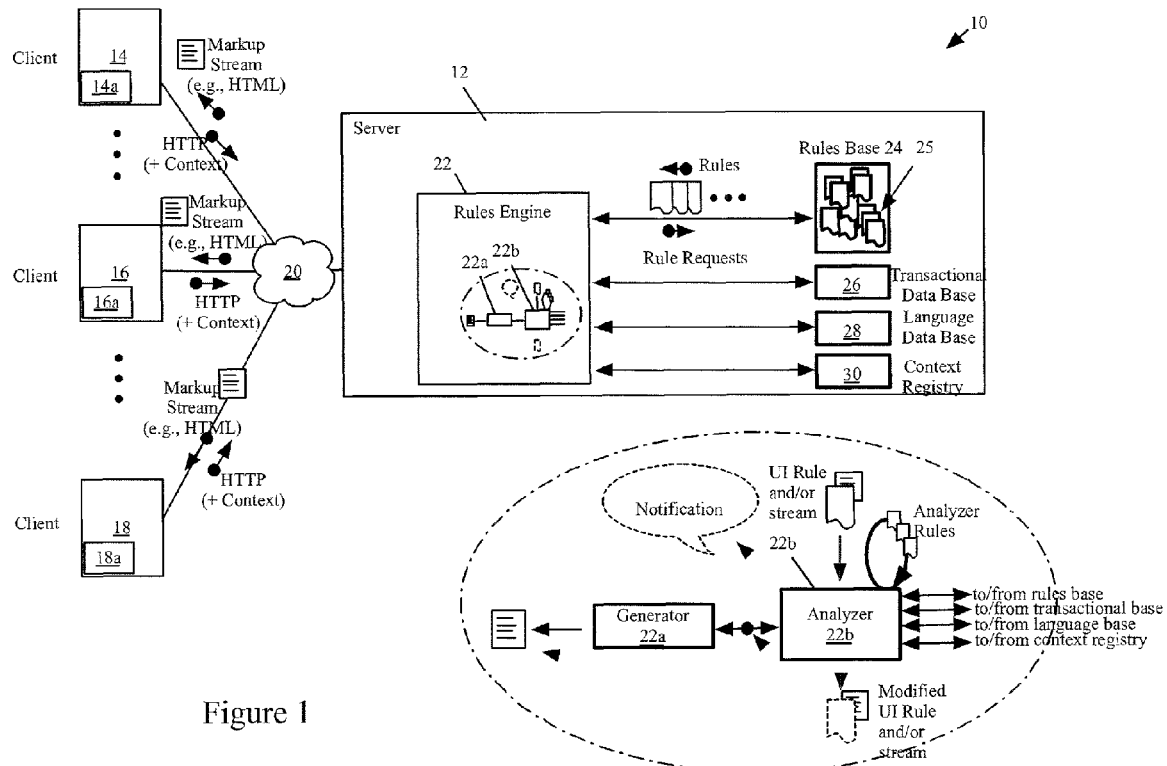
FIG. 1 depicts a digital data processing system according to the invention.

FIG. 1 depicts a digital data processing system 10 of the type in which the invention may be practiced. This includes a server digital data processor 12 that is coupled to client digital data processors 14, 16 and 18 via the Internet, a wide area network (WAN), metropolitan area network (MAN), local area network (LAN), telephone networks and/or a combination of these and other networks (wired, wireless, public, private or otherwise)—all indicated here by the network element 20.

The illustrated client digital data processors 14, 16, and 18 are conventional desktop computers, workstations, minicomputers, laptop computers, tablet computers, PDAs or other digital data processing apparatus of the type that are commercially available in the marketplace and that are suitable for operation in the illustrated system as described herein, all as adapted in accord with the teachings hereof. Here, those digital data processors are of the type and configuration used in a corporate or enterprise environment; however, the invention may be practiced in any variety of other computing environments, networked or otherwise.

The digital data processors 14, 16, 18 comprises central processing, memory, storage and input/output units and other constituent components (not shown) of the type conventional in the art that are configured to form application 14a, 16a, 18a respectively, which in the illustrated embodiment comprise software suitable for (i) displaying user interfaces generated by server 12 and transmitted to the respective processors 14, 16, 18 via network 20 and, preferably, for also (ii) generating requests for those interfaces and transmitting them to server 12, again, via network 20.

In the illustrated embodiment, those applications 14a, 16a, 18a comprise web browsers of the type commercially available in the marketplace and operative on the respective devices for, by way of example, retrieving web pages or other markup language streams, presenting those pages and/or streams (visually, aurally, or otherwise), executing scripts, controls and other code on those pages/streams, accepting user input with respect to those pages/streams (e.g., for purposes of completing input fields), issuing HTTP requests with respect to those pages/streams or otherwise (e.g., for submitting to a server information from the completed input fields), and so forth. The web pages or other markup language can be in HTML or other conventional forms, including embedded XML, scripts, controls, and so forth—again, per convention in the art. In other embodiments, applications 14a, 16a, 18a may perform fewer of these functions and may perform other functions, as well or instead.

Thus, by way of non-limiting example, one or more of applications 14a, 16a, 18a may comprise embedded rules engines, e.g., for executing rules transmitted respectively to them by server 12 (e.g., as part of the web pages, markup streams) or otherwise. While in some embodiments, such rules engines are architected and operated similarly to rules engine 22 of server 12, discussed below, in other embodiments they incorporate a subset of the functionality of engine 22, e.g., suited to the processing resources and/or demands of the digital data processors 14, 16, 18 upon which they operate.

While the forgoing functions attributed to applications 14a, 16a, 18a, are described, here, in the context of web pages, it will be appreciated that in other embodiments, one or more of the foregoing functions may be performed on the respective devices 14, 16, 18 other than by "web browser" software.

The central processing, memory, storage and input/output units of client digital data processors 14, 16, 18 may be configured to form and/or may be supplemented by other elements of the type known in the art desirable or necessary to support applications 14a, 16a, 18a, respectively, in accord with the teachings hereof, as well as to support other operations of the digital data processor 12. These can include, by way of non-limiting example, peripheral devices (such as keyboards and monitors), operating systems, database management systems, and network interface cards and software, e.g., for supporting communications with server digital data processor 12 and other devices over network 20.

Although digital data processors 14, 16, 18 are depicted and described in like manner here, it will be appreciated that this is for sake of generality and convenience: in other embodiments, these devices may differ in architecture and operation from that shown and described here and/or from each other, all consistent with the teachings hereof. Moreover, it will be appreciated that although only three closely positioned client devices 14, 16, 18 are shown, other embodiments may have greater or fewer numbers of these devices disposed near and/or far from one another, collocated behind one or more common firewalls or otherwise.

Like client digital data processors 14, 16, 18, the server digital data processor 12 is a digital data processing apparatus of the type commercially available in the marketplace suitable for operation in the illustrated system as described herein, as adapted in accord with the teachings hereof. Though the server 12 is typically implemented in a server-class computer, such as a minicomputer, it may also be implemented in a desktop computer, workstation, laptop computer, tablet computer, PDA or other suitable apparatus (again, as adapted in accord with the teachings hereof).

Server digital data processor 12, too, comprises central processing, memory, storage and input/output units and other constituent components (not shown) of the type conventional in the art that are configured in accord with the teachings hereof to form rules engine 22, rules base 24, transaction database 26, language database 28 and context registry 30, one or more of which may be absent in various embodiments of the invention.

Although only a single server digital data processor 12 is depicted and described here, it will be appreciated that this other embodiments may have greater or fewer numbers of these devices disposed near and/or far from one another, collocated behind one or more common firewalls or otherwise. Those other servers may differ in architecture and operation from that shown and described here and/or from each other, all consistent with the teachings hereof. Still further, although server 12 of the illustrated embodiment is depicted as being remotely disposed from the client digital data processors 14, 16 and 18, in other embodiments, one or more of the client devices may be disposed in vicinity of the server and, indeed, may be co-housed with it.

Rules base 24 comprises a conventional rules bases of the type known in the art (albeit configured in accord with the teachings hereof) for storing digitally encoded rules 25 and other application-related information in tables, database records, database objects, and so forth. Such stored rules 25 are likewise formatted and stored in the conventional manner known in the art (albeit configured in accord with the teachings hereof). Here, rules base 24 is configured and contains rules 25 for use in business process management applications, though in other embodiments it may be configured and used for other applications. A preferred such rules base is of the type described in the aforementioned incorporated-by-reference U.S. Pat. No. 5,826,250, entitled "Rules Bases and Methods of Access Thereof" and U.S. Pat. No. 7,640,222, entitled "Rules Base Systems and Methods with Circumstance Translation," though, a rules base that is architected and/or operated differently may be used as well.

Some embodiments may utilize multiple rules bases, e.g., an enterprise-wide rules base 24 on the server 12 and domain-specific rules bases on one or more of client devices 14, 16, 18, all by way of example. To the extent that multiple rules bases are provided in any given embodiment, they may be of like architecture and operation as one another; though, they may be disparate in these regards, as well. Utilization of multiple rules bases may be accomplished in the manner described in copending, commonly assigned U.S. patent application Ser. No. 13/031,097, entitled "Systems and Methods for Distributed Rules Processing," filed this same day herewith, the teachings of which are incorporated heron by reference.

Transactional data base 26 comprises a conventional data base of the type known in the art (albeit configured in accord with the teachings hereof) for storing corporate, personal, governmental or other data that may be any of generated, stored, retrieved and otherwise processed (hereinafter, collectively referred to as "processed") by rules in rules base 24 and/or rules stored/executed elsewhere. The data may of financial data, customer records, personal data, run-time data related to an application, or other type of data and it may be stored in tables, database records, database objects, and so forth.

As above, some embodiments may utilize multiple transactional database bases, e.g., an enterprise-wide data base 26 on the server 12 and branch-office specific data bases on the client devices 14, 16, 18, all by way of example. To the extent that multiple transactional data bases are provided in any given embodiment, they may be of like architecture and operation as one another; though, they be disparate in these regards, as well. Utilization of multiple transactional databases may be accomplished in the manner described in incorporated-by-reference U.S. patent application Ser. No. 13/031,097, entitled "Systems and Methods for Distributed Rules Processing," filed this same day herewith.

Language base 28 encodes information regarding the syntax of the language (or languages) in which user interfaces generated by server 12 are presented on devices 14, 16, 18 and, more particularly, in the illustrated embodiment, by applications 14a, 16a, 18a. That syntax can include one or more of grammar, spelling, usage, punctuation, and/or style. The language base 28 may comprise a language database of the variety commercially available in the marketplace—e.g., in the manner of spelling and grammar dictionaries provided with conventional word processors (which "dictionaries" often include usage-, punctuation- and/or style-related entries). Alternatively, the language syntax information may be embodied in one or more rules 25 of the rules base 24, or otherwise.

Context registry 30 is a store registry that includes information related to the respective contexts or circumstances in which the requested user interfaces (e.g., web pages) are and/or will be communicated to and executed on the respective client devices 14, 16, 18. That context or circumstance can include, by way of non-limiting example, user "properties" or business attributes (e.g., security permissions, disability settings, market segment, behavioral segment, age, locale, and so forth), client device 14, 16, 18 properties (e.g., processor speed, display size, keyboard capabilities, locale, and so forth), and communication channel properties (e.g., the speed and type of connection between server 12 and the respective client devices 14, 16, 18). That context or circumstance can further include, by way of non-limiting example, the language, country and/or other locale settings and preferences of the user of device to which the web page is to be displayed. Still other variations in the possible range of values stored in the context registry 30 are possible.

Illustrated digital data processor 12 also includes rules engine 22 of the type conventionally known in the art (albeit configured in accord with the teachings hereof) for use in processing rules from a rules base in order to process data, e.g., in (and/or for storage to) a transactional database, for example, in connection with events signaled to and/or detected by the engine. In the illustrated embodiment, the rules engine is of the type used for business process management applications, though in other embodiments it may be of the type used for other applications. Preferred such rules engines are of the type described in the aforementioned incorporated-by-reference U.S. Pat. No. 5,826,250, entitled "Rules Bases and Methods of Access Thereof" and U.S. Pat. No. 7,640,222, entitled "Rules Base Systems and Methods with Circumstance Translation" and/or U.S. patent application Ser. No. 11/681,269, filed Mar. 2, 2007, entitled "Proactive Performance Management For Multi-User Enterprise Software Systems," the teachings too of which are incorporated by reference herein—all as adapted in accord with the teachings hereof.

The rules engine 22 may be implemented in a single software program or module, or a combination of multiple software modules/programs. Moreover, it may comprise programming instructions, scripts, rules (e.g., rules stored in rules base 24) and/or a combination of thereof. And, even though the rules engine 22 of the illustrated embodiment is depicted as executing on just server digital data processor 12, in other embodiments, the engine may execute on or across multiple digital data processors (e.g., 12, 14, 16 and 18). Executing the engine over multiple digital data processors may be accomplished in the manner described in incorporated-by reference U.S. patent application Ser. No. 13/031,097, entitled "Systems and Methods for Distributed Rules Processing," filed by one or more of the same inventors hereof on this same day herewith, the teachings of which are incorporated herein by reference.

Rules

In a preferred embodiment, the rules 25 may comprise meta-information structures. These are structures that can include data elements and/or method elements. The latter can be procedural or declarative. In the former regard, for example, such a structure may be procedural insofar as it comprises one or more of a series or ordered steps (e.g., in a workflow). In the latter regard, such a structure may be declarative, for example, insofar as it sets forth (declares) a relation between variables, values, and so forth (e.g., a loan rate calculation or a decision-making criterion), or it declares the desired computation and/or result without specifying how the computations should be performed or the result achieved. By way of non-limiting example, the declarative portion of a meta-information structure may declare the desired result of retrieval of a specified value without specifying the data source for the value or a particular query language (e.g., SQL, CQL, .QL etc.) to be used for such retrieval. In other cases, the declarative portion of a meta-information structure may comprise declarative programming language statements (e.g., SQL). Still other types of declarative meta-information structures are possible.

While some rules may comprise meta-information structures that are wholly procedural and others may comprise those that are wholly declarative, the illustrated embodiment also contemplates rules 25 that comprise both procedural and declarative meta-information structures, i.e., rules that have meta-information structure portions that are declarative, as well as meta-information structure portions that are procedural (e.g., a rule that includes one portion defining one or more steps of a workflow and another portion that defines a decision-making criterion).

Rules of the illustrated embodiment that comprise meta-information structures may also reference and/or incorporate other such rules, which themselves may, in turn, reference and/or incorporate still other such rules. As a result, editing such rule may affect one or more rules (if any) that incorporate it.

Continuing the above example, a meta-information structure-based rule may include a procedural portion that defines a workflow process, as well as a reference to another meta-information structure-based rule that specifies a decision-making criterion for one of the steps in that workflow. If the meta-information structure containing that decision-making criterion is edited, it may affect the rule that references it and, therefore, affect processing of the workflow that referencing rule defines.

In another example, a rule that includes a meta-information structure for generating a web page may reference another rule with a meta-information structure portion that defines how social security numbers (SSNs) are displayed. If the latter rule is edited, e.g., to cause all SSNs to be partially blurred or blocked on display/entry (i.e., "obfuscated"), this may affect the former rule, i.e., causing the web page generated upon execution of the former rule to display the SSNs in an obfuscated format. Similarly, if several other meta-information-based rules for generating other web pages reference the social security-displaying rule, all of those respective web pages may be similarly affected.

An advantage of rules that comprise meta-information structures over conventional rules is that they provide users with the flexibility to apply any of code-based and model-driven techniques in the development and modification of software applications and/or computing platforms. Particularly, like models in a model-driven environment, meta-information structures comprise data elements that can be used to define any aspect of a complex system at a higher level of abstraction than source code written in programming languages such as Java or C++. On the other hand, users may also embed programming language statements into meta-information structures if they deem that to be the most efficient design for the system being developed or modified. At run-time, the data elements of the meta-information structures along with programming language statements (if any) are automatically converted into executable code by the rules engine.

Thus, in some embodiments, rules may be the primary artifacts that get created, stored (e.g., in a rules base 24) or otherwise manipulated to define and/or modify the overall functionality of rules-based applications that may automate and/or manage various types of work in different business domains at run-time. By way of non-limiting example, a plurality of rules stored in a rules base (e.g., 24) may be configured to define all aspects of a software application. Such a software application may include specialized software that is used within a specific industry or a business function (e.g., human resources, finance, healthcare, telecommunications etc.), or it may include a cross-industry application (e.g., a project management application, issue-tracking application etc.), or any other type of software application. As the software application executes on a digital data processor (e.g. any of 12, 14 and 18), any portion of the plurality rules that define the application may be retrieved from a rules base (e.g. 24) and processed/executed e.g., using a rules engine 22 in response to requests/events signaled to and/or detected by the engine at run-time.

User Interface Generation

Client devices 14, 16, 18 of the illustrated embodiment execute web browsers 14a, 16a, 18a, respectively, that "display" web pages and/or other markup language streams (collectively, "web pages" or, alternatively, "streams," "markup streams," "HTML streams," and so forth, in the discussion that follows, unless otherwise evident therefrom) received from server 12 via network(s) 20. These are typically web pages presented by the server 12 to the respective users of devices 14, 16, 18, e.g., as part of respective online sessions, although, they can be presented on other occasions and for other reasons, as well.

The aforementioned web pages can include conventional elements, such as display text, headers, links, still and moving images, and other display fields, as well as input fields for entry of data in text, numeric and/or alphanumeric (collectively, "text") formats, enumeration selection (e.g., dropdown lists, checkboxes, radio buttons, etc.), upload/download file selection, "submit" buttons (e.g., to signify that a page is ready for submission to the server 12), other controls, and so forth. These fields (or elements) may be supplemented and/or replaced by aural presentation fields (e.g., music files) and the like, again, in the conventional manner known in the art.

In the illustrated embodiment those web pages (or, more generally, markup streams) are generated by the server 12 and transmitted to the respective client devices 14, 16, 18 as a result of execution by rules engine 22 of rules 25, typically, in response to signaling from the client digital data processors 14, 16, 18 (e.g., by way of HTTP requests). However, those pages can also be generated by the server and transmitted to client devices as a result of execution of rules in response to other events, e.g., "asynchronously" generated web pages (or portions thereof) signaling completion of previously requested batch jobs, signaling notifications or other messaging from administrative functions in the system 10, other users, and so forth.

In this regard, it will be appreciated that rules base 24 of the illustrated embodiment can comprise multiple types of rules. Some (if not all) of the rules may be "user interface" rules that are directed to generation of web pages (or other mark up streams) via which users of client devices 14, 16, 18 communicate with server 12 and vice versa. Execution of these rules, for example, may directly or indirectly lead to one or more of the following, by way of non-limiting example, (i) establishing of online sessions with the respective client devices 14, 16, 18 and, more particularly, the users of applications 14a, 16a, 18a, executing thereon, (ii) generation of web pages (or, more generally, markup streams) in response to requests from those users (or, as noted above, in response to other events), and/or (iii) accepting and/or processing input from those users, e.g., in response to the web pages, all by way of non-limiting example. Others of the rules in rules base 24 may be directed to other features or tasks attendant to business process management, e.g., collaboration between users, rule/work management, optimization, simulation, batch processing of transactions, exchanging data with other computer systems, report generation, and so forth, all by way of example. Still other rules may execute on the central processing unit or other resources of the server 12 to provide one or more of the "rules engine" function, itself, again, in the conventional manner known in the art. Yet still other rules may define requirements for user interfaces generated by the user interface rules, e.g., in regard to language syntax (including, for example, grammar, spelling, usage, punctuation, and style), accessibility disabled users, amenability to and/or necessity of localization/globalization, security, and/or layout.

Thus, for example, in response to a request for a "loan validation" web page by the web browser 18a of client digital data processor 18, the rules engine 22 retrieves one or more of the rules 25 implicated by that request from the rules base 24 (if it has not already done so). Which of those rules 25 is implicated may be determined by the request itself, the context, the state of currently executing rules for that user, and so forth. A markup language generator 22a contained in rules engine 22 then processes those implicated rules, e.g., in view of that context, to select which input fields, output fields, submit buttons, display elements, etc., to include in the requested web page and how to configure those elements.

Figure 2:
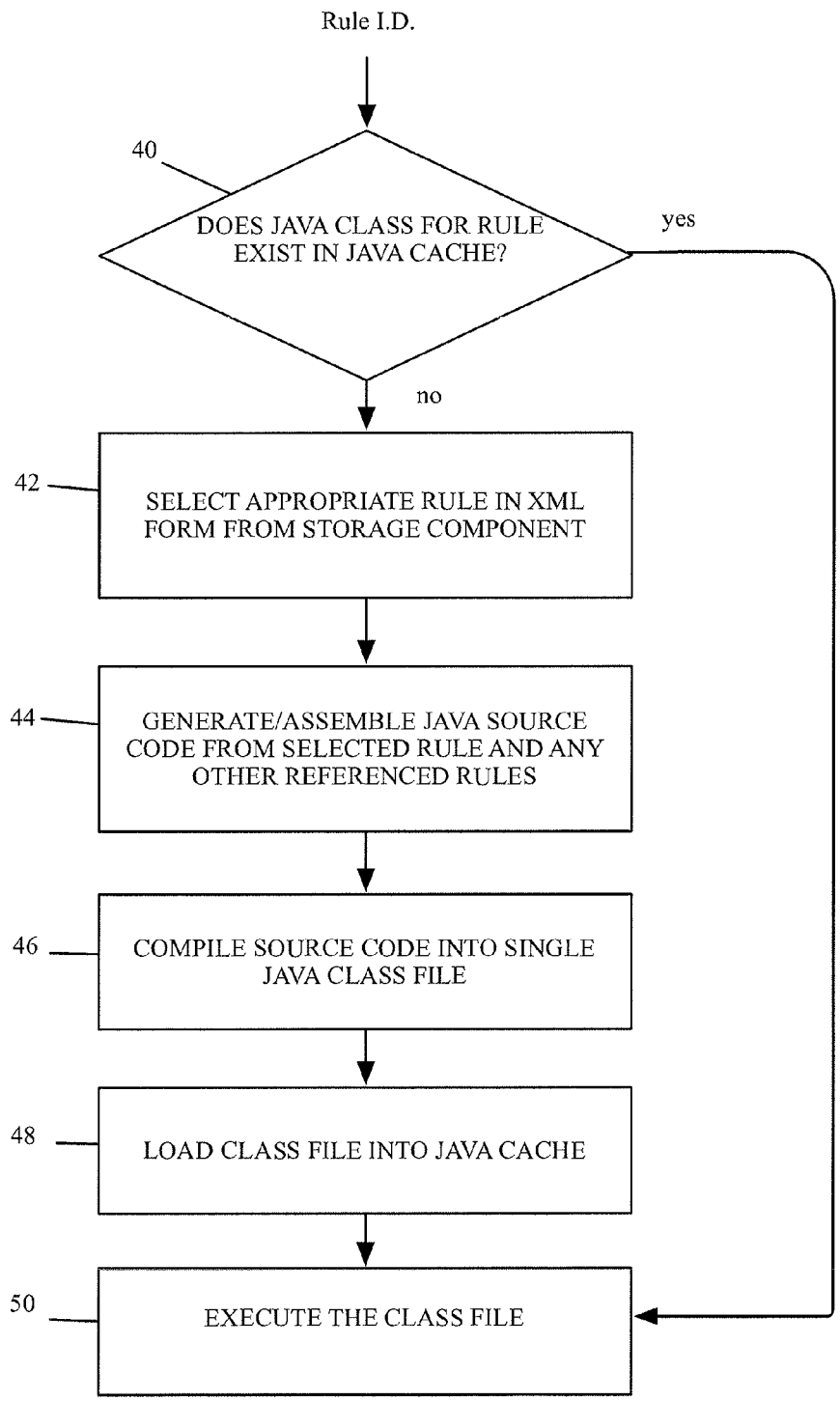
FIG. 2 depicts operation of a markup language generator component of a rules engine in the system of FIG. 1.

Operation of the generator 22a of the illustrated embodiment is shown in FIG. 2. As shown there, the illustrated generator 22 accepts the I.D. (e.g., name, key etc.) of the implicated rule as an input and determines if a Java class (for HTML stream generation) already exists in the Java cache (not shown) for that rule. See step 40. If so, processing proceeds to step 50, where that class is executed in order to generate the HTML stream. If not, processing proceeds to step 42, where the generator 22a retrieves the XML code defining the identified rule from rules base 24. Processing proceeds to step 44, where the generator 22a generates Java source code for the selected rule and any other rule it references. In step 46, the generator compiles that source code into a class file and, in step 48, it loads that file into the Java cache. In step 50, the generator executes that file, thereby, generating the appropriate markup language stream. Of course, it will be appreciated that the operation of generator 22a described here is merely an example and that other embodiments may generate markup streams from rules in other ways. Furthermore, even though the illustrated embodiment utilizes an XML data structure and Java source code, other embodiments may utilize other programming languages and/or utilize other data formats.

In the illustrated embodiment, such contextual selection and configuration is embedded in the rules themselves and/or forms part of the systematic processing of markup language streams, as discussed in incorporated-by-reference U.S. patent application Ser. Nos. 12/174,624 and 12/035,682. As noted above, as used herein "context" refers to the context in which the requested web page will be communicated to and executed on the client device. That context can include, by way of non-limiting example, user "properties" (e.g., security permissions, disabilities, market segment, behavioral segment (or other business-related attributes), age, locale, and so forth), client device 18 properties (e.g., processor speed, display size, keyboard capabilities, disability settings, and so forth), and communication channel properties (e.g., the speed and type of connection between devices 12 and 18).

Based on the aforesaid selection and configuration, the engine 22 constructs a markup language stream, e.g., in HTML or other conventional format or protocol. That stream is transmitted by the server 12, per convention, to the requesting client digital data processor, e.g., 18, for response by the user, e.g., completion of any input fields on the web page.

In the illustrated embodiment, the engine 22 constructs and forwards the markup stream to the browser 18*a* of device 18 substantially concurrently with its request for the corresponding web page, i.e., during the same online session on which that request was made and/or within the conventional time periods expected for response to a web page, though these are not requirements of the invention. The browser 18*a* of device 18 likewise substantially concurrently executes that stream for display to the user, e.g., within that same online session and/or within the conventional time periods expected for execution of a web page though, again, this is not a requirement of the invention.

Rules engine 22 responds similarly to requests from the web browser (or other application) 16*a* of client digital data processor 16, as well as to those from web browser (or other application 14*a*) of digital data processor 14.

In view of the foregoing, and by way of non-limiting example, it will be appreciated that the illustrated embodiment facilitates access to web applications and generation of web pages by disabled and non-disabled users alike. For example, the rules engine 22 can generate markup language streams representing the same substantive web page (e.g., a loan validation page) albeit with different user-accessibility features in response requests for that same page by client devices with different disability settings, e.g., settings reflecting that the respective users of the client devices have limited hand use, mobility, vision impairments or, conversely, no impairments at all. An appreciation of the operation of the illustrated system in these regards may be attained by reference to aforementioned incorporated-by-reference U.S. patent application Ser. No. 12/035,682, filed Feb. 22, 2008, entitled "User Interface Methods and Apparatus for Rules Processing."

By way of a still further non-limiting example, the rules engine 22 of the illustrated embodiment can provide access to web applications and web pages that are differentiated in accord with models that represent user (customer) behaviors, attributes and goals. Server 12 can thereby deliver otherwise substantively similar web pages that differ to fit the needs of the particular model to which each user fits. Such contextual selection and configuration of user interface elements allow the server 12 to deliver such solutions without the need for coding of multiple web pages, e.g., for each model to which users may belong. An appreciation of the operation of the illustrated system in these regards may be attained by reference to aforementioned incorporated-by-reference U.S. patent application Ser. No. 11/396,415, filed Mar. 30, 2006, entitled "User Interface Methods and Apparatus for Rules Processing."

By way of yet a still further non-limiting example, the rules engine 22 of the illustrated embodiment can facilitate globalization of user interfaces. Thus, server 12 can generate markup language streams representing the same substantive web pages (e.g., loan validation page 19), albeit in different languages for delivery to customers in different countries. It can effect such globalization (or "localization") not only with respect to the language, for example, of text fields, but also formatting of numeric and other fields (e.g., to reflect different currency formats). An appreciation of the operation of the illustrated system in these regards may be attained by reference to aforementioned incorporated-by-reference U.S. patent application Ser. No. 12/174,624, filed Jul. 16, 2008, entitled "Methods and Apparatus for Implementing Multilingual Software Applications."

User Interface Optimization

In addition to utilizing rules to generate web pages making up user interfaces as described above, the server 12 optimizes those interfaces and, more particularly, those web pages. Referring back to FIG. 1, the server 12 and, more particularly, the rules engine 22 utilizes an analyzer 22*b* to that end. The analyzer 22*b* may be implemented in a single software program or module, or a combination of multiple software modules/programs. Moreover, it may comprise programming instructions, scripts, rules (e.g., some of the rules 25 stored in rules base 24) and/or a combination of thereof. Even though, the analyzer 22*b* executes on server digital data processor 12 as part of the engine 22 in the illustrated embodiment in FIG. 1, in other embodiments, the analyzer 22*b* may execute separately on one or more digital processors in communication with server 12 and the other illustrated components installed thereon.

In the illustrated embodiment, that analyzer 22*b* is coupled to the generator 22*a* and operates in an "online" mode (e.g., at production time) to analyze "user interface" rules that are selected for execution from rules 25 of rules base 24 and/or to analyze the HTML stream generated from those rules by the generator, to determine if they are in conformity with one or more requirements. In other embodiments, the analyzer 22*b* may operate, instead or in addition, in an "offline" mode (e.g., at design time), wherein it determines whether one or more user interface rules that are, for example, being designed, tested or otherwise optimized, are in conformity with those requirements. In the offline mode, the user interface rules being analyzed may not necessarily be executed by the engine 22 to generate a user interface at the time of analysis. Instead, the analyzer 22*b* may simply retrieve one or more of the user interface rules from the rules base 24 and introspect their underlying data structure (e.g., scripts, code, logic, instructions, meta-data etc.) to determine conformity with the requirements. For sake of simplicity and without loss of generality, in the discussion that follows a user interface rule that is being analyzed by the analyzer 22*b* is referred to as a "rule being executed" or a "selected rule," regardless of whether the analyzer 22*b* is processing that rule in online or offline mode.

It will be appreciated that in both online and offline modes, the analyzer 22*b* may work in conjunction with the rules engine 22 to any of manage, track and implement analysis by the analyzer. The operation of the rules engine and/or analyzer in these regards may be governed by workflow(s) and other business process management (BPM) features (e.g., user collaboration, work management etc.) that may be defined by some of the rules 25 in rules base 24. For example, as was previously mentioned, a plurality of rules in rules base 24 may define a project management and/or issue tracking application that is executed by engine 22 at run-time. The analyzer 22b may communicate the results of the analysis in either offline or online mode to any of such applications that may, in turn, use the results data to generate and/or process one or more user interface optimization tasks associated with the results. An advantage of using such rules-based applications in conjunction with the analyzer 22b to manage and/or implement the results of the analysis may be that all user interface optimization tasks may be performed in one single unified environment using a common underlying rules-based data structure rather having to learn and/or convert data formats between different tools/technologies for various stages of the optimization tasks. Furthermore, performing all user interface optimization tasks in a unified environment may obviate the need for complex integration between digital data processing system 12 and disparate tools/applications using, for example, enterprise application integration (EAI)/middleware or other integration technologies that enable linkages between systems and/or applications. The communication between analyzer 22b and other applications is further discussed in connection with FIG. 3.

The requirements are defined, in the illustrated embodiment, by some of the rules 25 contained in rules base 24, though, in other embodiments, they may be defined in one or more other collections, such as a data base. Those requirement-defining rules set forth requirements for aspects of the user interface. In one embodiment, such aspects include language syntax (including, for example, grammar, spelling, usage, punctuation, and/or style), accessibility to disabled users, amenability to and/or necessity of localization/globalization, security, and/or layout. In other embodiments, the requirements may relate to only some of these aspects or for other additional aspects. In some other embodiments, the requirements can be defined relative to other of the rules 25 (and, particularly, for example, other user interface rules) in the rules base 24, to data in the transactional database 26, syntax information in the language database 28, and/or context information maintained in context registry 30.

Figure 3:
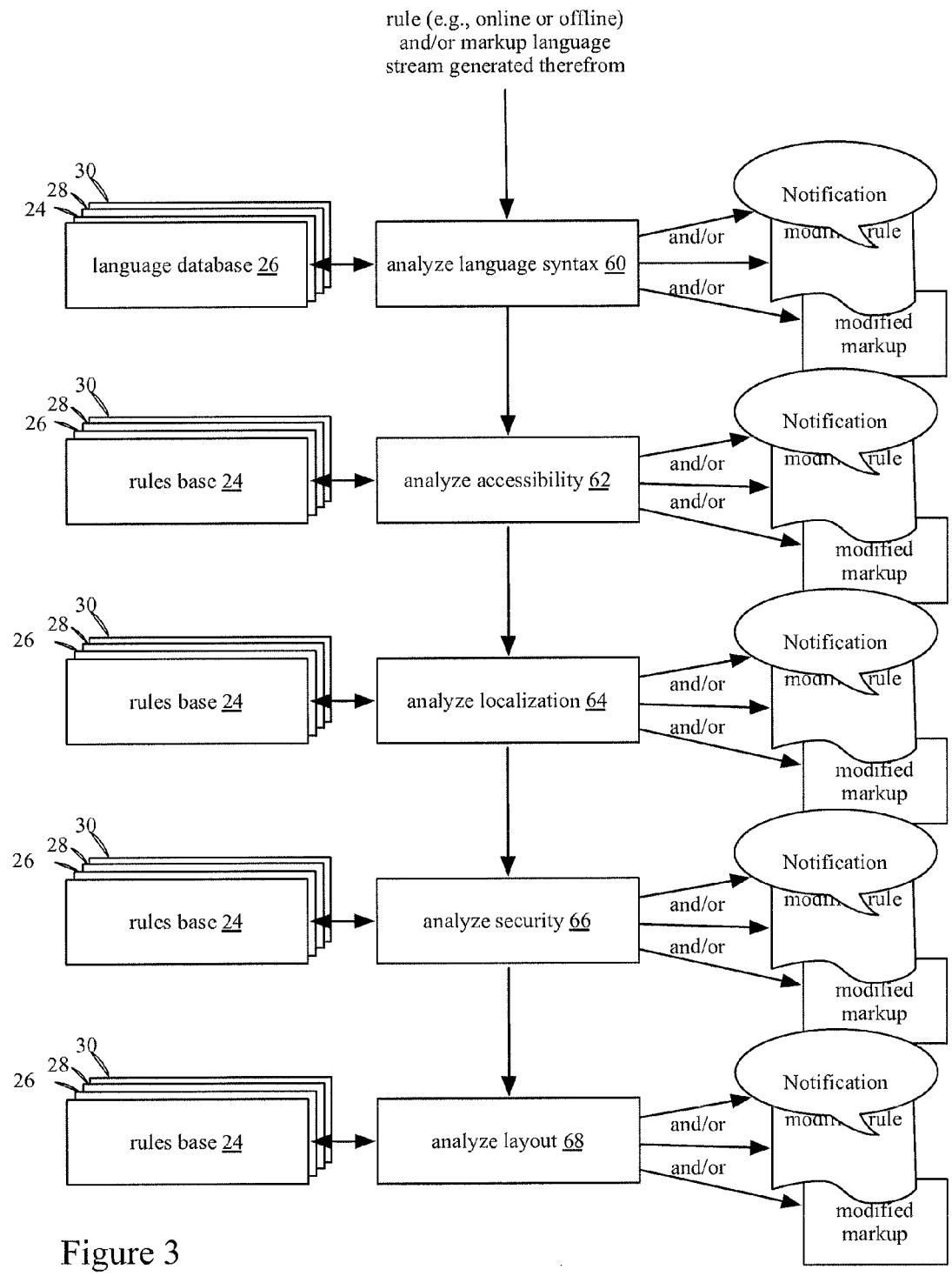
FIG. 3 depicts operation of a rule and/or markup language analyzer component in the system of FIG. 1.

Operation of the analyzer in these regards is illustrated in FIG. 3 and discussed below. The analyzer 22b accepts as input the rule being executed and/or the markup language stream generated from that rule. In additional embodiments, the analyzer 22b accepts the corresponding Java class file instead or in addition to the rule and/or markup language stream. However, for sake of simplicity and without loss of generality in the discussion that follows, analysis of the rule and/or stream is treated as tantamount to analysis of the class file. Though the analyzer 22b of some embodiments operates only at the level of granularity of a "web page," analyzing only those rules whose execution (when combined with that of referenced rules) will result in generation of an entire web page, a preferred analyzer 22b operates at larger and smaller levels of granularity. Such an analyzer can examine rules whose execution will result in generation of sequences of web pages, as well as those which will result in individual web pages and/or portions thereof, all in accord with the teachings hereof.

In embodiments where the analyzer 22b is configured to operate at the level of granularity of individual web pages/UIs, users of client devices (e.g., 14, 16 and 18) may be given an option to execute the analyzer 22b by pressing a button (e.g., entitled "Optimize My Form") on the web page that is to be analyzed. This button may be presented to some or all users of the client devices e.g., as determined by the relevant context (e.g., user role and/or security/privilege settings) at time of web page generation. By way of non-limiting example, the button may be displayed on the web page for a user of the client device that requested that page if the relevant context at the time of web page generation specifies user's role as a developer/administrator as opposed to an end user of the application that the web page is associated with. Such context-based generation of web pages and/or elements included therein is discussed in incorporated-by-reference U.S. patent application Ser. Nos. 11/396,415 and 12/035,682.

Upon execution or "launch" of the analyzer 22b (e.g., by pressing a button or otherwise), the user may then be shown a list of options (e.g. list of aspects) which enables the user to select all or some of the aspect of the web page/UI to be analyzed. The list of options may be displayed in a portion of the user interface/web page being analyzed or it may be displayed in a separate user interface (e.g., a pop-up window). Once the user makes the selections and the analysis is complete, the analyzer 22b may likewise present the results of the analysis in the user interface/web page being analyzed or in a separate user interface. The possibilities with regard to the outcome of the analysis are discussed in further detail below.

In other embodiments, the analyzer 22b may be implemented as a software wizard or otherwise such that users of client devices (e.g., 14, 16 and 18) are able to make a plurality of selections related to, for example, the desired level of granularity of the analysis (i.e., analyze one or more user interfaces, rules and/or portions thereof), the aspects to be analyzed, the priority (e.g., user interfaces associated with certain applications analyzed before user interfaces for other applications) and/or timing (e.g., certain user interfaces and/or potions thereof analyzed automatically upon triggering of an event or at pre-determined intervals) of the analysis tasks.

By way of non-limiting example, the analyzer 22b may be launched for multiple user interfaces and/or corresponding rules that pertain to one or more applications wherein the user selects a certain combination of aspects (e.g., security, accessibility, format etc.) to be analyzed for each of the user interfaces. Alternatively, the user may simply select an aspect of a single field or a section of a user interface to be analyzed. Where certain selections are not made by a user, the analyzer 22b may perform the analysis based on default settings (e.g., analyzer 22b configured to analyze all aspects of all the user interfaces for an application once every three months unless a user selects otherwise). Still other ways of configuring and/or implementing the analyzer 22b are possible. Regardless of the various embodiments of the analyzer 22b, the discussion that follows provides a description of the operation of analyzer 22b related to different aspects of the rule being executed.

In step 60, the analyzer 22b analyzes language syntax aspects of the rule being executed (combined with any referenced rules depending upon the level of granularity of the analysis) and/or the markup language stream generated therefrom. In the illustrated embodiment, it performs this task by comparing the display text specified in that rule and/or markup stream against the language database 28 to identify grammar, spelling, usage, punctuation, and/or style errors. Such comparison can be formed using techniques normally employed in the word processing arts to identify syntax errors in word processing documents.

If the analyzer detects syntax non-conformance as a result of the analysis in step 60, it performs one or more of the following steps:

(a) generating a notification of the non-conformance (i) for storage in log or other files on the server 12 and/or (ii) for output by the server 12, e.g., for logging and/or for display on a client devices—preferably, one operated by a business sponsor/architect, developer or administrator.
(b) identifying one or more modifications that would place the rule being executed and/or the markup language stream generated therefrom in conformance with the syntax defined in database 28, and generating a notification of those modifications for storage or output per steps (a)(i) and (a)(ii), above.
(c) modifying the rule being executed so that it and/or the markup language stream generated therefrom is in conformance with the syntax defined in database 28, and storing that rule to the rules base 24 or other suitable location,
(d) modifying the markup language stream that was generated from the rule being executed so that it is in conformance with the syntax defined in database 28, and outputting that markup language stream to (i) a client device 14, 16, 18 for presentation by a web browser or other application 14a, 16a, 18a, or (ii) a suitable store or other device.

Though the discussion above focuses on the analyzer's use of the language database 28 for syntax analysis, in other embodiments, the analyzer may instead or in addition access the rules base 24, the transactional data base 26, and/or the context registry 30 for like comparisons and/or for further information that may inform analysis of conformance of the user interface rule and/or stream with the language syntax requirements. Thus, by way of non-limiting example, reference to requirement-defining rules among rules 25 in the rules base 24 may inform the analyzer that the spelling requirements are to be relaxed for certain display text fields of the interface, thereby allowing, for example, the use of contractions, abbreviations and the like. And, by way of further example, reference to the context registry 30 may inform the analyzer of specific users' preferred languages, thus, affecting the analyzer's choice of access to the language database 28 for the appropriate language.

In step 62, the analyzer 22b analyzes the user interface rule being executed (combined with any referenced rules depending upon the level of granularity of the analysis) and/or the markup language stream generated therefrom in regard to accessibility to disabled users. In the illustrated embodiment, it performs this task by analyzing the various defining characteristics (e.g., type, content, size, and/or location) of display fields, input fields and other elements specified in the rule and/or markup language stream to determine if they need to be reconfigured or modified to be more suitably rendered for disabled users. In a preferred embodiment, requirements in this regard are defined by some of the rules 25 in the rules base 24 and ensure that the resulting user interface can be generated with proper user-accessibility features, e.g., in accord with the teachings of aforementioned incorporated-by-reference U.S. patent application Ser. No. 12/035,682, filed Feb. 22, 2008, entitled "User Interface Methods and Apparatus for Rules Processing."

By way of non-limiting example, a requirements-defining rule among rules 25 can specify that tooltip texts must be provided with all controls (e.g., input elements and control elements), as well as for all non-text display fields, in the user interface defined by a user interface rule being executed and/or corresponding markup stream. By way of further non-limiting example, such a requirement defining rule may prohibit the use of multiple icons on a user interface such that the initial focus is placed on the first input field when the user interface is first displayed as opposed to an icon. Still further, the same or one or more other requirement defining rules may require that all user interface elements utilize color schemes that will allow accessibility features (e.g., of the type specified in the aforementioned U.S. patent application Ser. No. 12/035,682) to function properly.

If the analyzer detects accessibility non-conformance as result of the analysis in step 62, it performs one or more of the following steps:
(a) generating a notification of the non-conformance (i) for storage in log or other files on the server 12 and/or (ii) for output by the server 12, e.g., for logging and/or for display on a client devices—preferably, one operated by a business sponsor/architect, developer or administrator.
(b) identifying one or more modifications that would place the rule being executed and/or the markup language stream generated therefrom in conformance with the accessibility requirements defined in rules base 24, and the generating a notification of those modifications for storage or output per steps (a)(i) and (a)(ii), above.
(c) modifying the rule being executed so that it and/or the markup language stream generated therefrom is in conformance with accessibility requirements defined in rules base 24, and storing that rule to the rules base 24 or other suitable location,
(d) modifying the markup language stream that was generated from the rule being executed so that it is in in conformance with accessibility requirements defined in rules base 24, and outputting that markup language stream to (i) a client device 14, 16, 18 for presentation by a web browser or other application 14a, 16a, 18a, or (ii) a suitable store or other device.

Though the discussion above focuses on the analyzer's use of the requirement defining rules in the rules base 24 for accessibility analysis, in other embodiments, the analyzer may instead or in addition access the transactional data base 26, the language database 28, the context registry 30, and/or other rules in the rules base 24 for information that may inform analysis of conformance of the user interface rule and/or stream with the accessibility requirements. Thus, by way of non-limiting example, reference to the transactional database 26 and the context registry 30 may inform the analyzer 22b that certain groups of disabled users consistently enter incorrect data in certain required input fields, thus, causing the analyzer to vary the conformity requirements (e.g., embodied in requirement defining rules among rules 25) for interfaces generated on behalf of those groups of users, e.g., so that the misused fields are highlighted, placed on separate web pages, varied in format, and so forth.

By way of further non-limiting example, one or more other rules in the rules base 24 may embody use cases for an application with which the user interface rule being executed and/or stream is associated. Such use cases may suggest that the application will be used by U.S. government users. Reference to these other use case rules in conjunction with rules that embody federal accessibility standards for user interface elements associated with U.S. government applications will allow the analyzer to determine conformance of the rule being executed and/or stream with the federal accessibility standards.

In step 64, the analyzer 22b analyzes the user interface rule being executed (combined with any referenced rules depending upon the level of granularity of the analysis) and/or the markup language stream generated therefrom in regard to its amenability to and/or necessity of localization (a/k/a globalization). In the illustrated embodiment, it performs this task by analyzing the various defining characteristics (e.g., type, content, size, and/or location) of display fields, input fields and other elements specified in the rule and/or markup language stream to ensure that they can be suitably localized and/or to perform that localization, depending upon the demands of a particular application. In a preferred embodiment, requirements in this regard are defined by some of the rules 25 in the rules base 24. These ensure that the resulting user interface can be generated for the appropriate locales e.g., in accord with the teachings of aforementioned incorporated-by-reference U.S. patent application Ser. No. 12/174,624, filed Jul. 16, 2008, entitled "Methods and Apparatus for Implementing Multilingual Software Applications."

If the analyzer detects localization non-conformance as result of the analysis in step 64, it performs one or more of the following steps:
  (a) generating a notification of the non-conformance (i) for storage in log or other files on the server 12 and/or (ii) for output by the server 12, e.g., for logging and/or for display on a client devices—preferably, one operated by a business sponsor/architect, developer or administrator.
  (b) identifying one or more modifications that would place the rule being executed and/or the markup language stream generated therefrom in conformance with the localization requirements defined in rules base 24, and the generating a notification of those modifications for storage or output per steps (a)(i) and (a)(ii), above.
  (c) modifying the rule being executed so that it and/or the markup language stream generated therefrom is in conformance with localization requirements defined in rules base 24, and storing that rule to the rules base 24 or other suitable location,
  (d) modifying the markup language stream that was generated from the rule being executed so that it is in conformance with localization requirements defined in rules base 24, and outputting that markup language stream to (i) a client device 14, 16, 18 for presentation by a web browser or other application 14a, 16a, 18a, or (ii) a suitable store or other device.

Though the discussion above focuses on the analyzer's use of the requirement defining rules in the rules base 24 for localization analysis, in other embodiments, the analyzer may instead or in addition access the transactional data base 26, the language database 28, the context registry 30 and/or other rules in the rules base 24 for information that may inform analysis of conformance of the user interface rule and/or stream with the localization requirements. Thus, by way of non-limiting example, reference to the transactional database 26 and/or the context registry 30 may inform the analyzer 22b that users in a geographic region of a country consistently enter monetary values, use spellings, etc., that differ from the recognized norm of that country, thus, causing the analyzer to vary the localization requirements for interfaces generated on behalf of those users, e.g., to ensure proper conversion and/or checking of values they enter and/or to display prompts that best match the expected form of input by those users.

By way of further non-limiting example, one or more other rules in the rules base 24 may embody use cases for an application with which the user interface rule being executed and/or stream is associated. Such use cases may suggest that the application may be used in five different countries including Germany. Reference to these other use case rules in conjunction with a requirement defining rule that mandates higher maximum lengths for user interface elements to be localized in German will allow the analyzer 22b to accurately determine conformance of the rule being executed and/or stream with the appropriate localization requirements (i.e., including Germany). On the contrary, analysis results output by the analyzer 22b without referencing the other use case rules could be markedly different if the maximum lengths for user interface elements are in compliance with the applicable requirements for all other locales.

In certain embodiments, a user interface rule being analyzed for localization may be designed such that all display elements included therein are translated from a base locale (e.g., American English or 'en_US') to other locales based upon corresponding translated values of the display elements that are included in other referenced rules (e.g., stored in rules base 24) that are configured for each such other locale (e.g., de_DE or German-speaking German locale). In such embodiments, a requirement-defining rule may specify that the display elements included in the user interface rule being analyzed need to be localized for the de_DE locale and the analyzer may determine non-conformance by searching for the referenced rule (e.g., in the rules base 24) that includes the corresponding translated values for the de_DE locale. If the search is unsuccessful, the analyzer may simply generate notification(s) of localization non-conformance according to steps (a) and/or (b) listed above. If the search is successful, the analyzer may still detect non-conformance in step 64, for example, due to an improper link/reference between the user interface rule being analyzed and the referenced rule for the de_DE locale. In this case, the analyzer may modify the user interface rule to fix reference/link according to step (c) and/or modify the markup according to step (d) by executing the referenced rule along with the user interface rule.

In step 66, the analyzer 22b analyzes the user interface rule being executed (combined with any referenced rules depending upon the level of granularity of the analysis) and/or the markup language stream generated therefrom in regard to security, e.g., whether one or more elements of the user interface require special treatment in connection with their display and/or entry via the client applications 14a, 16a, 18a. In the illustrated embodiment, it performs this task by analyzing defining characteristics (e.g., the ID.'s, formats and/or content) of display fields, input fields and other elements specified in the user interface to determine if they necessitate application of security requirements defined by one or more requirement defining rules among rules 25 in the rules base 24.

By way of non-limiting example, a requirements-defining rule 25 can specify that all fields in the user interface defined by a user interface rule being executed and/or corresponding markup stream containing social security numbers, passwords, financial account numbers or other such confidential information must be partially or fully obscured (a/k/a "obfuscated") upon display by and/or entry via an application 14a, 16a, 18a on a client device.

If the analyzer detects security non-conformance as result of the analysis in step 66, it performs one or more of the following steps:
  (a) generating a notification of the non-conformance (i) for storage in log or other files on the server 12 and/or (ii) for output by the server 12, e.g., for logging and/or for display on a client devices—preferably, one operated by a business architect/sponsor, developer or administrator.
  (b) identifying one or more modifications that would place the rule being executed and/or the markup language stream generated therefrom in conformance with the security requirements defined in rules base 24, and the generating a notification of those modifications for storage or output per steps (a)(i) and (a)(ii), above.
  (c) modifying the rule being executed so that it and/or the markup language stream generated therefrom is in conformance with security requirements defined in rules base 24, and storing that rule to the rules base 24 or other suitable location, (d) modifying the markup language stream that was generated from the rule being executed so that it is in in conformance with security requirements defined in rules base 24, and outputting that markup language stream to (i) a client device 14, 16, 18 for presentation by a web browser or other application 14a, 16a, 18a, or (ii) a suitable store or other device.

Though the discussion above focuses on the analyzer's use of requirement defining rules in the rules base 24 for security analysis, in other embodiments, the analyzer may instead or in addition access the transactional data base 26, the language database 28, the context registry 30 and/or other rules in the rules base 24 for information that may inform analysis of conformance of the user interface rule and/or stream with the security requirements. Thus, by way of non-limiting example, reference to the transactional database 26 may inform the analyzer 22b that certain groups of users commonly enter social security numbers as user i.d.'s when setting up accounts, thus, causing the analyzer to vary the display format, prompting or validation requirements for interfaces generated on behalf of those users, e.g., warning them not to use such i.d.'s, blocking their acceptance as proper user names, or obfuscating them upon entry where the user i.d.'s of other groups of users are not obfuscated.

In step 68, the analyzer 22b analyzes the user interface rule being executed (combined with any referenced rules depending upon the level of granularity of the analysis) and/or the markup language stream generated therefrom in regard to formatting and layout (collectively, "layout"). In the illustrated embodiment, it performs this task by analyzing the defining characteristics (e.g., i.d.'s, formats, locations, etc.,) of display fields, input fields and other elements specified in the rule and/or markup language stream to determine whether they meet formatting requirements defined by some of the rules 25 in the rules base 24.

By way of non-limiting example, a requirements-defining rule among rules 25 can specify that all fields that appear on user interfaces generated by one set of rules for presentation by applications 14a, 16a, 18a run by an enterprise's employees that also appear on a user interface generated (e.g., by another set of user interface rules) for presentation by like applications run by an enterprise's CEO must appear at the top of any web pages generated for the employees (hence, ensuring that what is important to the CEO is of priority to the employees). Similarly, a requirement defining rule may specify that any field that is included (or not included) in a user interface presented/displayed to managers within a company should also be included (or not included) on user interfaces that are used by the direct reports of those managers within that company.

By way of further non-limiting example, a requirements-defining rule among rules 25 can specify arrangement of field types in the user interface defined by a user interface rule being executed and/or corresponding markup stream, e.g., prohibiting ordering of field types that would cause the user to have to jump excessively between input devices (e.g., a drop-down control atop a text field atop another drop-down control). Such a requirements-defining rule 25 can help avoid interfaces that degrade performance by forcing the user to go from mouse to keyboard and back again, excessively.

By way of still further non-limiting example, a requirements-defining rule among rules 25 can specify color contrast of field in a user interface defined by a user interface rule being executed and/or corresponding markup stream, e.g., ensuring that colors of web page backgrounds, fields, images and so forth meet specified branding and/or aesthetic requirements.

By way of still further non-limiting example, a requirements-defining rule among rules 25 can specify whitespace in a user interface defined by a user interface rule being executed and/or corresponding markup stream, e.g., ensuring consistency across columns, sections, and other regions of the user interface. Such a requirements-defining rule 25 can likewise define a quantity of unused area on web pages in the user interface, e.g., ensuring that such web pages are not, on the one hand, overloaded with text or images and, on the other hand, overly devoid of such elements.

By way of yet still further non-limiting example, a requirements-defining rule among rules 25 can specify alignment in a user interface defined by a user interface rule being executed and/or corresponding markup stream, e.g., again, ensuring consistency across columns, sections, and other regions of the user interface, as well as ensuring proper visual hierarchy through indenting.

By way of still yet further non-limiting example, a requirements-defining rule among rules 25 can specify labeling requirements in a user interface defined by a user interface rule being executed and/or corresponding markup stream, e.g., ensuring that buttons, columns and other elements of the user interface bear consistent and appropriate labels.

By way of yet still further non-limiting example, a requirements-defining rule among rules 25 can avoid redundancy in a user interface defined by a user interface rule being executed and/or corresponding markup stream, e.g., checking for columns, buttons and other fields with the same name.

By way of further non-limiting example, a requirements-defining rule among rules 25 can require tooltips on certain or all input and non-text display elements in a user interface defined by a user interface rule being executed and/or corresponding markup stream, e.g., ensuring ease of navigation.

By way of yet still further non-limiting example, a requirements-defining rule among rules 25 can require breadcrumbs, tabs and other navigational aids in a user interface defined by a user interface rule being executed and/or corresponding markup stream, e.g., ensuring that users of the interface know where they are in a sequence of web pages or process.

By way of yet still further non-limiting example, a requirements-defining rule among rules 25 can require accord between the actual or likely resolution of user display (e.g., on device 14a, 16a, 18a) and width or length of columns and other elements in a user interface defined by a user interface rule being executed and/or corresponding markup stream, e.g., ensuring that there are not too many columns in a grid or list view, too many columns in a section, etc., that would cause or necessitate horizontal and vertical scrolling.

If the analyzer detects layout non-conformance as result of the analysis in step 68, it performs one or more of the following steps:

(a) generating a notification of the non-conformance (i) for storage in log or other files on the server 12 and/or (ii) for output by the server 12, e.g., for logging and/or for display on a client devices—preferably, one operated by a business architect/sponsor, developer or administrator.

(b) identifying a one or more modifications that would place the rule being executed and/or the markup language stream generated therefrom in conformance with the layout requirements defined in rules base 24, and the generating a notification of those modifications for storage or output per steps (a)(i) and (a)(ii), above.

(c) modifying the rule being executed so that it and/or the markup language stream generated therefrom is in conformance with layout requirements defined in rules base 24, and storing that rule to the rules base 24 or other suitable location, (d) modifying the markup language stream that was generated from the rule being executed so that it is in in conformance with layout requirements defined in rules base 24, and outputting that markup language stream to (i) a client device 14, 16, 18 for presentation by a web browser or other application 14a, 16a, 18a, or (ii) a suitable store or other device.

Though the discussion above focuses on the analyzer's use of the requirement defining rules in rules base 24 for layout analysis, in other embodiments, the analyzer may instead or in addition access the transactional data base 26, the language database 28, the context registry 30, and/or other rules in the rules base 24 for information that may inform analysis of conformance of the user interface rule and/or stream with the layout requirements.

Thus, by way of non-limiting example, reference to the transactional database 26 and context registry 30 may inform the analyzer 22b that a given input field is used a high percentage of times by a certain group of users, thus, causing the analyzer 22b to update the rule(s) being executed and/or stream to impose the layout requirements for that field to effect its higher placement on any web pages on which it appears for those group of users. While such a positioning requirement for that field could potentially be imposed directly by a layout requirement-defining rule placed in the rules base 24 at development time, the field's frequent usage might not be apparent until production time, when actual users of applications 14a, 16a, 18a begin entering data into that field.

Similarly, reference to the transactional database 26 may inform the analyzer 22b that there is a correlation between two fields (e.g., a required and non-required field) on a user interface such that a particular field (e.g., a non-required field) is populated 85% of the time when another field (e.g., a required field) is populated. This may cause the analyzer 22b to update the rule(s) being executed and/or stream generated therefrom to impose the layout requirements for those two fields to be positioned next to each other on a user interface. While such a positioning requirement for those fields could potentially be imposed directly by a layout requirement-defining rule placed in the rules base 24 at development time, the correlation between the two fields' usage might not be apparent until production time, when actual users of applications 14a, 16a, 18a begin entering data into those fields.

By way of non-limiting example, reference to and/or introspection of one or more other rules in a rules base 24 may inform the analyzer 22b that a given input field (or display field) appears on a report that is defined by those rules and is viewed daily by the CEO. This again may cause the analyzer 22b to update the rule(s) being executed and/or stream to impose the layout requirements for that field to effect its higher placement on any user web pages on which it appears. Again, while such a positioning requirement for that field could potentially be imposed directly by a layout requirement-defining rule placed in the rules base 24 at development time, the field's appearance on the CEO's daily report might not be evident to the designers of the rule(s) being executed during their development.

Similarly, reference to and/or introspection of one or more other workflow and/or decisioning rules in rules base 24 may inform the analyzer 22b that the value for a given input field is used as part of a decision-making criteria in a workflow defined by the other rules. This again may cause the analyzer 22b to update the rule(s) being executed and/or stream to impose the layout requirements for that field to effect its marking/editing as a required field on any user web pages on which it appears. Again, while such a formatting requirement for that field could potentially be imposed directly by a layout requirement-defining rule placed in the rules base 24 at development time, the use of the field's value in the workflow and/or decision making might not be evident to the designers of the rule(s) being executed during their development.

It will be appreciated that even though the discussion above focuses on the analyzer's use of any of rules 25, rules base 24, transactional data base 26, the language database 28 and the context registry 30 for information that may inform analysis for aspects in steps 60-68 of the rule being executed and/or stream, in other embodiments, the analyzer 22b may instead or in addition access log files or other data (e.g., stored on digital data processors on any of 12, 14, 16 and 18) related to the results of previous analyses performed by the analyzer 22b. By way of non-limiting example, if a particular field was previously deemed to be a high priority and/or a required field in a particular context, the analyzer may log and/or store that result in any of steps 68 a(i), a(ii) and (b). Thus, the analyzer 22b can simply refer to that previously stored/logged result and the context registry 30 for any subsequent analyses of rule(s) being executed and/or stream that include that field.

It will also be appreciated that the occurrence of any of the alternatives (a)-(d) after the analysis in any of steps 60-68, will depend upon a variety of factors. By way of non-limiting example, step (d) may be performed without step (c) in situations where a user is testing and/or developing a user interface in the off-line mode discussed above. In this scenario, a user may only want to modify the markup language stream and examine the result (e.g., in a web browser) before modifying the rule that is being analyzed. Step (d) can thus be performed iteratively (e.g., sometimes in combination with steps (a) and/or (b)) without step (c) to allow a developer to make changes to the markup stream, examine the result(s) of those changes, make further changes to the markup, examine the new changes, etc. After the user/developer has fined-tuned the changes through this iterative process, the user/developer may then decide to make and store the rule change(s), which reflect the fine-tuned markup, via step (c).

Other factors that may influence the occurrence of any of the alternatives (a)-(d) after the analysis in any of steps 60-68 include security privileges/permissions related to viewing notifications, making modifications and/or access to other workflows/applications that are in communication with the analyzer 22b. For example, the security permissions/privileges of a user may only allow that user to see whether there are any notifications of non-conformance via step (a) and/or identified modifications via step (b); but not to implement some or all of such identified modifications through steps (c) and/or (d). Alternatively, a user may have permission to make markup modifications pursuant to step (d) but not to authorize rule changes via step (c)—or vice versa.

In another embodiment, a user may have the appropriate security privileges/permissions to perform any of steps (c) and (d) but may still be unable to do so due to various reasons. For example, the rule and/or markup being analyzed may be (at least) temporarily not modifiable due to it being reviewed, executed, modified or otherwise used by another user at the time that the user is attempting to perform any of modification steps (c) and (d). In some such cases, a task list of modifications pursuant to the notifications in step (b) may be created and placed in a queue for implementation when the rule becomes available for modification (or some time afterwards).

As previously mentioned, such task list generation and/or performance of any of steps (a)-(d) may be performed by the analyzer 22b in conjunction with another application(s) (e.g. issue tracking or project management application) that is in communication with the analyzer 22b. By way of non-limiting example, such an application(s) may comprise workflows/processes (e.g. defined by some of the rules 25) that would allow for routing, reviewing, authorizing, implementing and otherwise managing any of the modification tasks generated in the application as a result of steps (c) and/or (d). Still other variations in the type of functionality of such applications in conjunction with the analyzer 22b are possible.

Described herein are methods and systems meeting the objects set forth above, among others. It will be appreciated that the illustrated embodiments and those otherwise discussed herein are merely examples of the invention and that other embodiments, incorporating changes thereto, fall within the scope of the invention, of which we claim.

The invention claimed is:

1. A method for user interface optimization, including:
   A. on a digital data processing system that comprises one or more digital data processors, identifying one or more rules for execution by a rules engine in order to generate any of a markup language page providing a user interface and a markup language stream providing the user interface,
   B. on the digital data processing system, executing a step of determining whether one or more aspects of the user interface generated as a result of execution of one or more of the rules is in conformity with one or more requirements,
   C. responding to a negative such determination by executing on the digital data processing system any of the steps of:
      i. generating a notification that identifies modifications to one or more of the rules which would result in generation of any of said markup language page and markup language stream providing a conforming user interface, wherein the conforming user interface includes a field having a modified display characteristic vis-à-vis a non-conforming user interface otherwise resulting from execution of one or more of the rules, and wherein the display characteristic is modified based on one or more of the requirements relating to a correlation between transactional data associated with the field having the modified display characteristic and transactional data associated with another field,
      ii. modifying one or more of the rules to generate any of said markup language page and markup language stream providing the conforming user interface,
      iii. modifying any of said markup language page and markup language stream to provide the conforming user interface, and
   D. any of storing to and generating as an output from said digital data processing system a result of one or more steps executed in step C.

2. The method of claim 1, wherein one or more of the rules comprise any of metadata and one or more programming language statements.

3. The method of claim 1, wherein said aspects of the user interface pertain to one or more of a language syntax of the user interface, including any of grammar, spelling, usage, punctuation, and style; accessibility of the user interface by disabled users; amenability of the user interface to localization/globalization; the need for localizing/globalizing the user interface; security; and layout.

4. The method of claim 3, wherein one or more of said aspects of the user interface pertain to tooltips provided with one or more fields of the user interface.

5. The method of claim 3, wherein one or more of said aspects of the user interface pertain to obfuscating one or more fields of the user interface.

6. The method of claim 3, wherein one or more of said aspects of the user interface pertain to any of priority of fields, color contrast, whitespace, alignment, field and/or element labels, redundancy, tool tips, progress indicators, and display resolution.

7. The method of claim 6, wherein one or more of said aspects of the user interface pertain to whitespace in tables, sections and other portions of the user interface.

8. The method of claim 6, wherein one or more of said aspects of the user interface pertain to use of redundant headers in tables, sections and other portions of the user interface.

9. The method of claim 6, wherein one or more of said aspects of the user interface pertain to width and/or length of the user interface in view of an expected resolution of a user display.

10. The method of claim 6, wherein one or more of said aspects of the user interface pertain to visual hierarchy and/or indenting.

11. The method of claim 6, wherein one or more of said aspects of the user interface pertain to arrangement of field types.

12. The method of claim 11, wherein one or more of said aspects of the user interface pertain to use of field types that require a user to jump excessively between input devices.

13. The method of claim 6, wherein the requirement pertains to a display resolution preference and wherein a said conforming user interface includes a scrolling characteristic vis-a-vis the non-conforming user interface which would result from a said rule.

14. The method of claim 6, wherein the requirement pertains to a quantity of unused area and wherein a said conforming user interface includes a reduced percentage of unused area vis-a-vis the non-conforming user interface which would result from a said rule.

15. The method of claim 6, wherein the requirement pertains to an alignment characteristic and wherein a said conforming user interface includes an altered alignment characteristic vis-a-vis the non-conforming user interface which would result from a said rule.

16. The method of claim 6, wherein the requirement pertains to a security trait and wherein a said conforming user interface includes a feature that obfuscates at least one display or input field vis-a-vis the non-conforming user interface which would result from a said rule.

17. The method of claim 6, wherein the requirement pertains to a path of user interfaces, and wherein a said conforming user interface includes a feature reflecting the path vis-a-vis the non-conforming user interface which would result from a said rule.

18. The method of claim 1, wherein one or more of the requirements are defined by a further rule.

19. The method of claim 1, wherein one or more of the requirements are defined in any of a data base and a rules base.

20. The method of claim 1, wherein one or more of the requirements are defined in accord with one or more other rules and/or a user interface generated based thereby; one or more transactional data relating to the user interface; a context in which the user interface is any of transmitted, displayed and/or viewed by a user; and a collection defining any of grammar, spelling, usage, punctuation, style of the user interface.

21. The method of claim 1, wherein the modified display characteristic is any of position, size, color or other attribute.

22. The method of claim 1, wherein a said conforming user interface includes a field that is repositioned vis-a-vis the non-conforming user interface which would result from a said rule.

23. The method of claim 22, wherein a location of said repositioned field is based on a location of another field in said user interface.

24. The method of claim 23, wherein the repositioned field is repositioned in accord with requirements defined in accord with one or more other rules and/or a user interface generated based thereon; one or more transactional data relating to the user interface; a context in which the user interface is any of transmitted, displayed and/or viewed by a user.

25. The method of claim 23, wherein the repositioned field is repositioned to bring one or more of the following aspects of the user interface in conformity with the requirements: a language syntax of the user interface, including any of grammar, spelling, usage, punctuation, and style; accessibility of the user interface by disabled users; amenability of the user interface to localization/globalization; the need for localizing/globalizing the user interface; security; and layout.

26. The method of claim 22, wherein a location of said repositioned field is based on a preferred position for that field.

27. The method of claim 26, wherein the repositioned field is repositioned in accord with requirements defined in accord with one or more other rules and/or a user interface generated based thereon; one or more transactional data relating to the user interface; a context in which the user interface is any of transmitted, displayed and/or viewed by a user.

28. The method of claim 26, wherein the repositioned field is repositioned to bring one or more of the following aspects of the user interface in conformity with the requirements: a language syntax of the user interface, including any of grammar, spelling, usage, punctuation, and style; accessibility of the user interface by disabled users; amenability of the user interface to localization/globalization; the need for localizing/globalizing the user interface; security; and layout.

29. The method of claim 1, wherein a said conforming user interface includes a field that is any of added to and removed from the user interface vis-a-vis the non-conforming user interface which would result from a said rule.

30. The method of claim 29, wherein such addition or deletion of said field is based on a requirement defined in accord with one or more other rules and/or a user interface generated based thereon; one or more transactional data relating to the user interface; and, a context in which the user interface is any of transmitted, displayed and/or viewed by a user.

31. The method of claim 29, wherein such addition or deletion of said field is effected to bring one or more of the following aspects of the user interface in conformity with the requirements: a language syntax of the user interface, including any of grammar, spelling, usage, punctuation, and style; accessibility of the user interface by disabled users; amenability of the user interface to localization/globalization; the need for localizing/globalizing the user interface; security; and layout.

32. The method of claim 29, wherein such addition or deletion of said field is based on any of inclusion and exclusion of another field in the user interface.

33. The method of claim 32, wherein such addition or deletion of said field is based on a requirement defined in accord with one or more other rules and/or a user interface generated based thereon; one or more transactional data relating to the user interface; and a context in which the user interface is any of transmitted, displayed and/or viewed by a user.

34. The method of claim 32, wherein such addition or deletion of said field is effected to bring one or more of the following aspects of the user interface in conformity with the requirements: a language syntax of the user interface, including any of grammar, spelling, usage, punctuation, and style; accessibility of the user interface by disabled users; amenability of the user interface to localization/globalization; the need for localizing/globalizing the user interface; security; and layout.

35. The method of claim 1, wherein a said conforming user interface includes a field that has a modified display characteristic vis-a-vis the non-conforming user interface which would result from a said rule.

36. The method of claim 35, wherein the modified display characteristic is based on a requirement defined in accord with one or more other rules and/or a user interface generated based thereon; one or more transactional data relating to the user interface; and, a context in which the user interface is any of transmitted, displayed and/or viewed by a user.

37. The method of claim 35, wherein such modified display characteristic is effected to bring one or more of the following aspects of the user interface in conformity with the requirements: a language syntax of the user interface, including any of grammar, spelling, usage, punctuation, and style; accessibility of the user interface by disabled users; amenability of the user interface to localization/globalization; the need for localizing/globalizing the user interface; security; and layout.

38. The method of claim 35, wherein the modified display characteristic is based on another field in the user interface.

39. The method of claim 38, wherein the modified display characteristic is based on a requirement defined in accord with one or more other rules and/or a user interface generated based thereon; one or more transactional data relating to the user interface; and a context in which the user interface is any of transmitted, displayed and/or viewed by a user.

40. The method of claim 38, wherein the modified display characteristic is effected to bring one or more of the following aspects of the user interface in conformity with the requirements: a language syntax of the user interface, including any of grammar, spelling, usage, punctuation, and style; accessibility of the user interface by disabled users; amenability of the user interface to localization/globalization; the need for localizing/globalizing the user interface; security; and layout.

41. A method for reconfiguring user interfaces, including:
A. on a digital data processing system that comprises one or more digital data processors, providing one or more rules for execution by a rules engine in order to generate any of a markup language page providing a user interface and a markup language stream providing the user interface,
B. on the digital data processing system, executing a step of determining whether one or more aspects of the user interface generated as a result of execution of one or more of the rules is in conformity with one or more requirements,
C. wherein one or more of the requirements are defined in accord with:
   i. one or more of the rules, and
   ii. one or more transactional data relating to the user interface, D. wherein the determining step includes determining whether one or more fields of the user interface defined by any of said markup language page and markup language stream generated by execution of the one or more rules is in conformity with said requirements,
E. responding to a negative such determination by executing on the digital data processing system any of the steps of:
   i. generating a notification that identifies modifications to one or more of the rules which would result in generation of any of said markup language page and markup language stream providing a conforming user interface, wherein the conforming user interface includes a field having a modified display characteristic vis-à-vis a non-conforming user interface otherwise resulting from execution of one or more of the rules, and wherein the display characteristic is modified based on one or more of the requirements relating to a correlation between transactional data associated with the field having the modified display characteristic and transactional data associated with another field,
   ii. modifying one or more of the rules to generate any of said markup language page and said markup language stream providing the conforming user interface,
   iii. modifying any of said markup language page and said markup language stream to provide the conforming user interface conforming with the one or more requirements, and
F. any of storing to and generating as an output from said digital data processing system a result of one or more steps executed in step E.

42. A method for user interface optimization, including:
A. on a digital data processing system that comprises one or more digital data processors, identifying one or more rules for execution by a rules engine in order to generate any of a markup language page providing a web browser user interface and a markup language stream providing a web browser user interface,
B. on the digital data processing system, executing a step of determining whether one or more aspects of the web browser user interface that would be effected as a result of execution of one or more of the rules is in conformity with one or more requirements,
C. responding to a negative such determination by executing on the digital data processing system any of the steps of:
   i. generating a notification that identifies modifications to one or more of the rules which would result in generation of any of said markup language page and markup language stream providing a conforming web browser user interface, wherein the conforming user interface includes a field having a modified display characteristic vis-à-vis a non-conforming user interface otherwise resulting from execution of one or more of the rules, and wherein the display characteristic is modified based on one or more of the requirements relating to a correlation between transactional data associated with the field having the modified display characteristic and transactional data associated with another field,
   ii. modifying one or more of the rules to effect generation of any of said markup language page and markup language stream that provide the conforming web browser user interface,
   iii. modifying any of said markup language page and markup language stream to provide the conforming web browser user interface, and
D. any of storing to and generating as an output from said digital data processing system a result of one or more steps executed in step C.

* * * * *